(12) United States Patent
Tsuzaki et al.

(10) Patent No.: US 6,952,309 B1
(45) Date of Patent: Oct. 4, 2005

(54) OPTICAL AMPLIFIER AND OPTICAL AMPLIFICATION METHOD

(75) Inventors: Tetsufumi Tsuzaki, Yokohama (JP);
Masayuki Nishimura, Yokohama (JP);
Masayuki Shigematsu, Yokohama (JP);
Hitoshi Hatayama, Yokohama (JP);
Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/667,576

(22) Filed: Sep. 22, 2000

Related U.S. Application Data

(63) Continuation-in-part of application No. PCT/JP00/01660, filed on Mar. 17, 2000.

(30) Foreign Application Priority Data

| Jul. 9, 1999 | (JP) | P11-196251 |
| Jul. 27, 1999 | (JP) | P11-212190 |

(51) Int. Cl.⁷ .................................................. H01S 3/00
(52) U.S. Cl. .................................................. 359/341.41
(58) Field of Search ................. 359/341.41, 341.42, 359/341.1, 341.4, 341.2, 341.5, 337, 337.1, 337.2

(56) References Cited

U.S. PATENT DOCUMENTS

| 4,842,358 A | | 6/1989 | Hall ........................... 455/566 |
| 5,340,979 A | * | 8/1994 | Baney ......................... 250/214 |
| 5,374,973 A | * | 12/1994 | Maxham ..................... 359/341 |
| 5,448,390 A | * | 9/1995 | Tsuchiya et al. ............. 359/132 |
| 5,619,368 A | | 4/1997 | Swanson ..................... 385/12 |
| 5,745,283 A | | 4/1998 | Inagaki et al. ............... 359/341 |
| 5,812,710 A | * | 9/1998 | Sugaya ........................ 385/27 |
| 5,894,362 A | * | 4/1999 | Onaka et al. ................ 359/124 |
| 5,966,236 A | * | 10/1999 | Okuno ........................ 359/337 |
| 5,986,782 A | * | 11/1999 | Alexander et al. .......... 359/110 |
| 5,995,275 A | * | 11/1999 | Sugaya et al. ............... 359/341 |
| 6,023,366 A | * | 2/2000 | Kinoshita .................... 359/341 |
| 6,049,413 A | * | 4/2000 | Taylor et al. ................ 359/337 |
| 6,072,601 A | * | 6/2000 | Toyohara .................... 358/484 |
| 6,097,535 A | * | 8/2000 | Terahara ................. 359/341.41 |
| 6,144,486 A | | 11/2000 | Bennett et al. ......... 359/337.13 |
| 6,151,157 A | * | 11/2000 | Ball et al. .............. 359/337.12 |
| 6,151,158 A | * | 11/2000 | Takeda et al. ......... 359/337.12 |
| 6,219,176 B1 | * | 4/2001 | Terahara .................. 359/341.1 |
| 6,256,428 B1 | | 7/2001 | Norwood et al. ............. 385/17 |

(Continued)

FOREIGN PATENT DOCUMENTS

| EP | 0 897 205 | 2/1999 |
| JP | 04147114 A | 5/1992 |

(Continued)

OTHER PUBLICATIONS

Becker et al. Erbium Doped Fiber Amplifiers. Academic Press, Mar. 8, 1999.*

(Continued)

*Primary Examiner*—Thomas H. Tarcza
*Assistant Examiner*—Deandra M. Hughes
(74) *Attorney, Agent, or Firm*—McDermott Will & Emery LLP

(57) ABSTRACT

A optical filter has a loss spectrum whose gradient $dL/d\lambda$ of a loss L (dB) with respect to the wavelength $\lambda$ (nm) is variable in the wavelength band of multiplexed signal light. A control circuit detects each power of signal light components demultiplexed by an optical coupler and controls the power of optical pumping light to be supplied to an optical amplification section from an optical pumping light sources such that the power of output signal light has a predetermined target value. The control circuit also controls the gradient $dL/d\lambda$ of the optical filter on the basis of powers of the signal light components.

31 Claims, 20 Drawing Sheets

U.S. PATENT DOCUMENTS

| | | | | |
|---|---|---|---|---|
| 6,282,361 | B1 * | 8/2001 | Nishimura et al. | 385/140 |
| 6,292,289 | B1 * | 9/2001 | Sugaya et al. | 359/337 |
| 6,359,726 | B1 * | 3/2002 | Onaka et al. | 359/337.1 |
| 6,366,393 | B1 * | 4/2002 | Feulner et al. | 359/337 |
| 6,885,499 | B1 * | 4/2005 | Hoshida et al. | 359/337 |

FOREIGN PATENT DOCUMENTS

| | | | |
|---|---|---|---|
| JP | 06276154 A | 9/1994 | |
| JP | 6-276154 | 9/1994 | H04B/10/04 |
| JP | 09191303 A | 7/1997 | |
| JP | 9-230400 | 9/1997 | G02F/1/35 |
| JP | 10-22924 | 1/1998 | H04B/10/14 |
| JP | 10022924 A | 1/1998 | |
| JP | 10229386 A | 8/1998 | |
| JP | 10-256634 | 9/1998 | H01S/3/10 |
| JP | 11133364 | 5/1999 | |
| JP | 11249089 A * | 9/1999 | G02F/1/01 |

OTHER PUBLICATIONS

Wysocki et al. OFC '97, Feb. 16–21, 1997.*
Kim et al. LEOS '98. Dec. 1–4, 1998 vol. 2.*
Lee et al. IEEE Phot. Tech. Letts. vol. 8, No. 12, Dec. 1996.*
Kinoshita et al. Fujitsu Sci. Tech. J., 35, 1, Jul. 1999.*
Toba et al. IEEE Phot. Tech. Letts. vol. 5 No. 2 Feb. 1993.*
Machine translation of Inoue et al. JP 6–276154.*
Hatayama et al. "Variable attenuation slope compensator (VASC) using silica–based planar lightwave circuit technology for active gain slope control in EDFAs" Mar. 17–10, 2000 Optical Fiber Communication Conference, 2000 pp 142–144 vol. 2.*
Pan et al. "Multiwavelength Fiber–Amplifier Cascades with Equalization Employing Maxh–Zehnder Optical Filter" Dec. 1995 IEE Photonics Technology Letters vol. 7, No. 12, pp. 1501–1503.*
Offrein et al. "Adaptive Gain and Channel Equalization Filters for Applications in Optical Networks" IEEE Lasers and Electro–Optics Society 1999 12th Annual Meeting, vol. 2, 1999 pp. 747–748.*

Okamoto et al. "Eight–Channel Flat Spectral Response Arrayed–Waveguide Multiplexer with Asymmetrical Mach–Zehnder Filters" Mar. 1996, IEEE Photonics Technology Letters vol. 8 No. 3 pp. 373–374.*
"Active Gain Slope Compensation in Large–Capacitory, Long–Haul WDM Transmission System", Takao Nalto et al., OAA' WC5, Jun. 9–11, 1999, pp. 36–39.
"Tunable Gain Equalization Using a Mach–Zehnder Optical Filter in Multistage Fiber Amplifiers", Kyo Inoue et al., IEEE Photonics Technology Letters, vol. 3, No. 8, Aug. 1991, pp. 718–720.
"Broadband Variable Optical Attenuator in Silica Waveguide Technology", T.V. Clapp et al., ECOC'98, Sep. 20–24, 1998, pp. 301–302.
"Large Capacity WDM Transmission Based on Wideband Erbium–Doped Fiber Amplifiers", Susumu Kinoshita et al, OSA TOPS, vol. 25 Optical and Their Applications, pp. 258–261.
Hiromu Toba et al., "Demonstration of Optical FDM Based Self–Healing Ring Network Employing ArrayedWaveguide––Grating ADM Filters and EDFAs", NTT Transmission Systems Laboratories, pp. 263–266
Kyo Inoue, et al. "Tunable Gain Equalization Using a Mach–Zehnder Optical Filter in Multistage Fiber Amplifiers", IEEE Photonics Technology Letters, Aug. 3, 1991, pp. 718–720.
Hiromu Toba et al. "Demonstration of Optical FDM Based Self–Healing Ring Network Employing ArrayedWaveguide––Grating ADM Filters and EDFAs", Proceedings of ECOC'94 (1994), pp. 263–266.
T. Naito, et al., "Active Gain Slope Compensation in Large Capacity, Long–Haul WDM Transmission System", Proceedings of OAA'98, WC5, (1999), pp. 36–39.
M. Takeda, et al., "Active Gain–Tilt Equalization by Preferentially 1.43 µm–or 1.48 µm–Pumped Raman Amplification", ThA3, pp. 76–79.

* cited by examiner

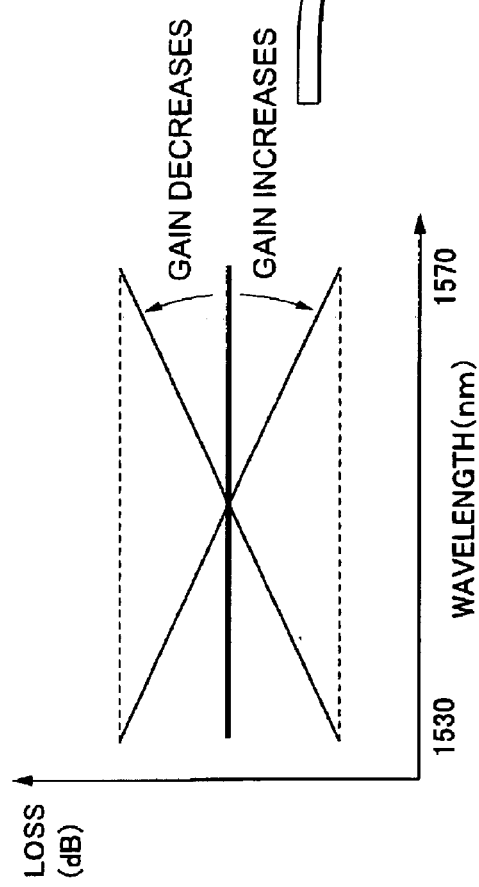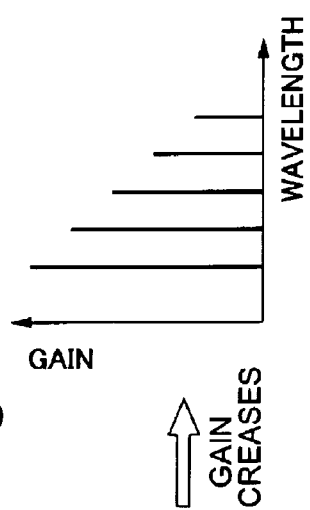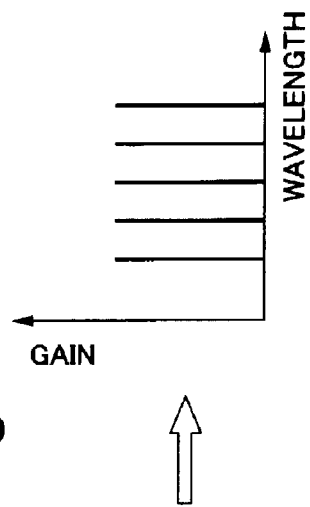

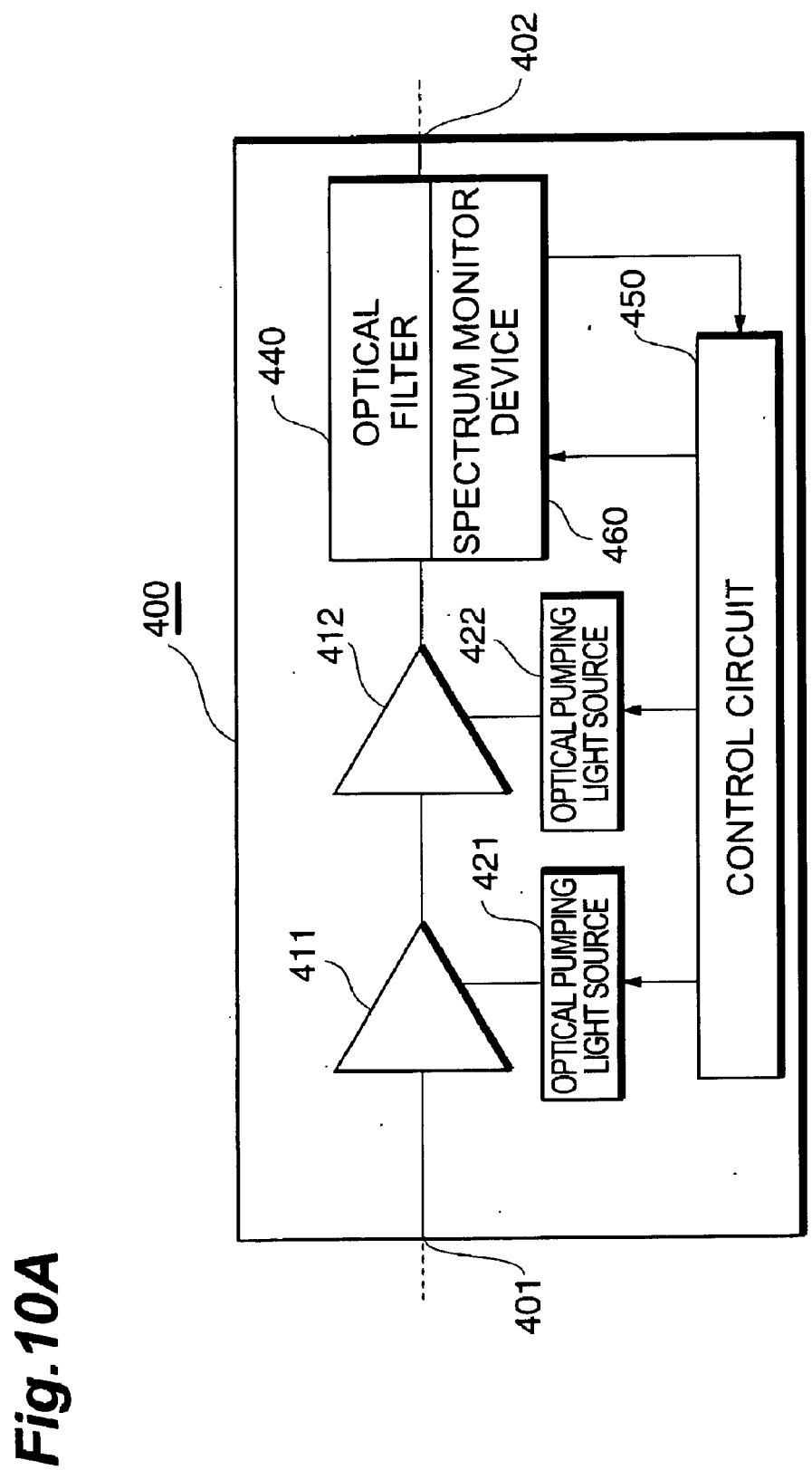

OPTICAL AMPLIFIER AND OPTICAL AMPLIFICATION METHOD

RELATED APPLICATIONS

This is a Continuation-In-Part application of International Patent Application Ser. No. PCT/JP00/01660 filed on Mar. 17, 2000 now pending.

BACKGROUND OF THE INVENTION

1. Field of the Invention

The present invention relates to an optical amplifier and optical amplification method of amplifying, at once, a multiplexed signal in which a plurality of signal light components having different wavelengths belonging to a predetermined wavelength band are multiplexed.

2. Related Background Art

The optical amplifier which amplifies signal light by guiding to a waveguide doped with a fluorescent material together with optical pumping light of such fluorescent material is well known. Such an optical amplifier is provided in a relay station in an optical transmission system. Especially, an optical amplifier used in a wavelength-multiplexed transmission system for transmitting multiplexed signal light in which a plurality of signal light components having different wavelengths are multiplexed optically must amplify the plurality of signal light components at once at an equal gain, and also amplify the power of each of the plurality of signal light components to a predetermined target value and output the signal light.

For example, reference 1, K. Inoue, et al., "Tunable Gain Equalization Using a Mach-Zehnder Optical Fiber in Multistage Fiber Amplifiers", IEEE Photonics Technology Letters, Vol. 3, No. 8, pp. 718–720 (1991) is disclosed a technique of flattening the gain of an optical amplifier by an optical fiber using a Mach-Zehnder interferometer. Reference 2, S. Kinoshita, et al., "Large Capacity WDM Transmission Based on Wideband Erbium-Doped Fiber Amplifiers", OSA TOPS, Vol. 25, pp. 258–261 (1998) is disclosed a technique in which an optical attenuator with a variable attenuation factor is inserted between the input-side optical amplification section and the output-side optical amplification section of an optical amplifier so as to maintain constant power of signal light input to the output-side optical amplification section even when the power of signal light input to the input-side optical amplification section varies, thereby maintaining the power of signal light output from the optical amplifier at a predetermined target value and simultaneously maintaining constant gain deviation of the entire optical amplifier.

SUMMARY OF THE INVENTION

In the technique described in reference 1, however, for example, applicant has found that to keep the power of signal light output from the optical amplifier at a predetermined target value when the loss in the input-side transmission line of the optical amplifier varies due to some reason, and the power of signal light input to the optical amplifier varies, the gain of optical amplification of signal light in the optical amplifier must be changed. If the gain is changed, the wavelength dependence of gain varies. This damages the gain flatness of the optical amplifier, and the plurality of signal light components output from the optical amplifier have different powers or so-called deviation.

In the technique described in reference 2, applicant has found that to keep the power of signal light input to the output-side optical amplification section at a predetermined target value by the optical attenuator when the signal light input to the input-side optical amplification section has sufficiently high power, the power must be largely attenuated by the optical attenuator. As a result, the pumping efficiency lowers to degrade the noise factor.

The present invention has been made to solve the above problems, and has as its object to provide an optical amplifier and optical amplification method capable of maintaining the output signal light power and gain flatness without degrading the noise factor even when the input signal light power varies.

In order to achieve the above object, according to the present invention, there is provided an optical amplifier for amplifying, at once, multiplexed signal light belonging to a predetermined wavelength band, in which a plurality of signal light components having different wavelengths are multiplexed, characterized by comprising (1) one or a plurality of optical amplification sections each of which has an optical waveguide doped with a fluorescent material and amplifies the multiplexed signal light by optical pumping of the fluorescent material, (2) an optical pumping light source for supplying predetermined optical pumping light to the optical amplification section, (3) an optical filter capable of changing a gradient $dL/d\lambda$ of a loss L (dB) with respect to a wavelength $\lambda$ (nm) in the predetermined wavelength band, and (4) control means for controlling an optical pumping light output from the optical pumping light source such that light power after amplification has a predetermined target value, and for adjusting a characteristic of the optical filter to adjust a final gain characteristic.

On the other hand, an optical amplification method according to the present invention is characterized by comprising the steps of (1) guiding the multiplexed signal light to an optical waveguide doped with a fluorescent material together with predetermined optical pumping light and optically amplifying the multiplexed signal light, (2) guiding at least one of the multiplexed signal light before amplification and that after amplification to an optical filter capable of changing a gradient $dL/d\lambda$ of a loss L (dB) with respect to a wavelength $\lambda$ (nm) in the predetermined wavelength band and adjusting the gradient $dL/d\lambda$ of the optical filter to reduce a wavelength-dependent gain in the optical amplification, and (3) adjusting an intensity of the optical pumping light to adjust light power after amplification to a predetermined target value.

According to the optical amplifier or optical amplification method of the present invention, even when the input signal light power to the optical amplifier varies, the output signal light power from the optical amplifier can be maintained at a predetermined target value. In addition, even when the gain of the optical amplification section has a wavelength dependence due to variation in input signal light power, the gain flatness of the entire optical amplifier can be maintained by adjusting the gradient $dL/d\lambda$ of the loss L of the optical filter with respect to the wavelength $\lambda$.

This optical filter preferably satisfies $$L \approx a(\lambda - \lambda c) + b$$

(where $\lambda c$ (nm) and b (dB) are constants) in the predetermined wavelength band and changes a (dB/nm) to adjust the gradient $dL/d\lambda$. Such an optical filter can easily adjust the gradient $dL/d\lambda$. When $\lambda c$ is set in the predetermined wavelength band, the loss L at the wavelength $\lambda c$ in the predetermined wavelength band always becomes constant. This enables design with an emphasis on the noise characteristic at $\lambda c$.

The optical amplifier may further comprise a gain equalizer for compensating for a inherent wavelength-dependent gain of the optical amplification section. In this case, the gain equalizer equalizes the inherent wavelength-dependent gain of the optical amplification section, and the optical filter compensates for variation in input multiplexed signal light power. This makes the gain flatness of the entire optical amplifier more excellent and facilitates control/adjustment.

Preferably, the optical amplifier further comprises a wave number monitor for detecting the number of signal light components contained in the multiplexed signal light, and the control means adjusts the target value of light power after amplification in accordance with the number of signal light components detected by the wave number monitor. Even when the power of input multiplexed signal light varies due to an increase/decrease in the number of signal light components, the power of each multiplexed signal light component can be maintained constant.

The gradient $dL/d\lambda$ of the optical filter may be adjusted, e.g., 1) on the basis of the detection result from input light power detection means for detecting the light power input to the optical amplification section, 2) on the basis of the detection result from gain detection means for detecting a gain of the optical amplification section, 3) on the basis of power deviation between shortest and longest wavelengths detected by detecting each wavelength and power of signal light components contained in the light output from the optical amplification section, or 4) such that a level difference between ASE light levels detected by ASE light level detection means for detecting an ASE light level of each of wavelengths outside two ends of the predetermined wavelength band of the light output from the optical amplification section. Each wavelength and power of signal light components contained in the light output from the optical amplification section may be detected, and an ASE light level of a wavelength at a shorter wavelength than detected shortest wavelength and at a longer wavelength than detected longest wavelength may be detected and used for adjustment. In case 3) or 4), a wavelength for which the power deviation or ASE light level is to be detected may be determined on the basis of information related to the shortest and longest wavelengths, which are sent together with the multiplexed signal light.

In addition, when a total transmittance in the predetermined wavelength band of the optical filter is adjusted to a maximum value, the loss L is preferably adjusted to be substantially constant independently of the wavelength. This enables to reduce the noise factor especially when the input multiplexed signal light power is small.

Any one of the above arrangements and methods facilitates adjustment of the gradient $dL/d\lambda$ of the optical filter and realizes the object of the present invention.

The optical filter in the optical amplifier according to the present invention preferably comprises (1) a main optical path which guides the multiplexed signal light and is divided into first to sixth regions sequentially from an upstream side, (2) a first sub optical path which is arranged close to the first and third regions of the main optical path so that optical coupling of propagation light occurs, is spaced apart from the second region of the main optical path so that optical coupling of the propagation light does not occur, and has a region corresponding to the second region of the main optical path, the region having a length different from that of the main optical path, (3) a second sub optical path which is arranged close to the fourth and sixth regions of the main optical path so that optical coupling of the propagation light occurs, is spaced apart from the fifth region of the main optical path so that optical coupling of the propagation light does not occur, and has a region corresponding to the fifth region of the main optical path, the region having a length different from that of the main optical path, (4) a first temperature adjusting device arranged in at least one of the second region of the main optical path and the region of the first sub optical path, which corresponds to the second region of the main optical path, and (5) a second temperature adjusting device arranged in at least one of the fifth region of the main optical path and the region of the second sub optical path, which corresponds to the fifth region of the main optical path.

On the other hand, in the optical amplification method according to the present invention, preferably, an optical filter comprising (1) a main optical path which guides the multiplexed signal light and is divided into first to sixth regions sequentially from an upstream side, (2) a first sub optical path which is arranged close to the first and third regions of the main optical path so that optical coupling of propagation light occurs, is spaced apart from the second region of the main optical path so that optical coupling of the propagation light does not occur, and has a region corresponding to the second region of the main optical path, the region having a length different from that of the main optical path, and (3) a second sub optical path which is arranged close to the fourth and sixth regions of the main optical path so that optical coupling of the propagation light occurs, is spaced apart from the fifth region of the main optical path so that optical coupling of the propagation light does not occur, and has a region corresponding to the fifth region of the main optical path, the region having a length different from that of the main optical path is used, and the gain wavelength dependence reduction step comprises adjusting at least one of a temperature in the first sub optical path and a temperature in a region of the main optical path, which corresponds to the first sub optical path, and at least one of a temperature in the second sub optical path and a temperature in a region of the main optical path, which corresponds to the second sub optical path to adjust the gradient $dL/d\lambda$ of the optical filter.

Each of the first and second sub optical paths and the corresponding main optical path form a Mach-Zehnder interference device. In each Mach-Zehnder interference device, when the temperature of at least one of the optical paths is adjusted, the wavelength dependence of loss in each main optical path can be adjusted. Hence, this optical filter is suitable for the optical amplifier and optical amplification method according to the present invention.

The present invention will be more fully under-stood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 7A to 7D are views for explaining the operation of the optical amplifier according to the first embodiment;

FIGS. 8, 9, and 10A are schematic views showing the arrangements of optical amplifiers according to the second to fourth embodiments of the present invention, respectively.

DESCRIPTION OF THE PREFERRED EMBODIMENTS

Figure 1:
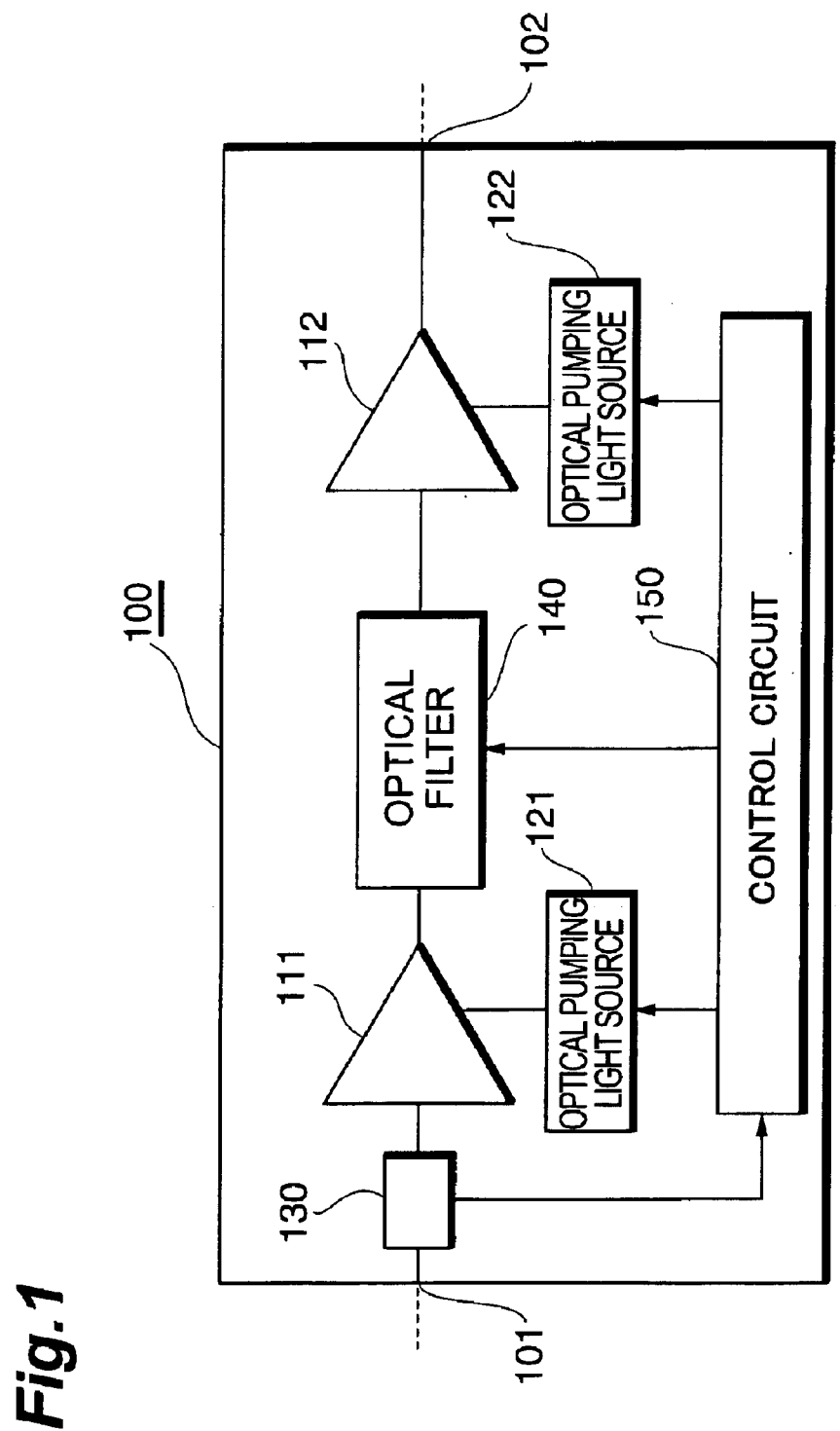
FIG. 1 is a schematic view showing the arrangement of an optical amplifier according to the first embodiment of the present invention.

Preferred Embodiments of the present invention will be described below in detail with reference to the accompanying drawings. To facilitate the comprehension of the explanation, the same reference numerals denote the same parts, where possible, throughout the drawings, and a repeated explanation will be omitted.

First Embodiment

FIG. 1 is a schematic view of an optical amplifier according to the first embodiment. In the optical amplifier 100 according to this embodiment, an optical coupler 130, input-side optical amplification section 111, optical filter 140, and output-side optical amplification section 112 are sequentially connected in series between an optical input terminal 101 and an optical output terminal 102. The optical amplifier 100 also has optical pumping light sources 121 and 122 for supplying optical pumping light to the input-side optical amplification section 111 and output-side optical amplification section 112, respectively, and a control circuit 150 for controlling the light powers from the optical pumping light sources 121 and 122 and the loss spectrum of the optical filter 140.

The optical coupler 130 demultiplexes some components of multiplexed signal light input to the optical input terminal 101, outputs the components to the control circuit 150, and outputs the remaining components to the input-side optical amplification section 111. The input-side optical amplification section 111 receives optical pumping light from the optical pumping light source 121, optically amplifies the multiplexed signal light sent from the optical coupler 130 at once, and outputs the signal light. The optical filter 140 has a loss spectrum in which the total loss is almost constant in the wavelength band of the multiplexed signal light, and the gradient of loss with respect to the wavelength is variable in the wavelength band. The output-side optical amplification section 112 receives optical pumping light from the optical pumping light source 122, optically amplifies the multiplexed signal light sent from the optical filter 140 at once, and outputs the signal light to the optical output terminal 102.

The control circuit 150 detects the power of multiplexed signal light demultiplexed by the optical coupler 130. The control circuit 150 controls the power of optical pumping light to be output from the optical pumping light sources 121 and 122 on the basis of the power of input multiplexed signal light such that the power of output multiplexed signal light obtains a predetermined target value. The control circuit 150 also controls the loss spectrum of the optical filter 140 on the basis of the power of input multiplexed signal light.

Figure 2:
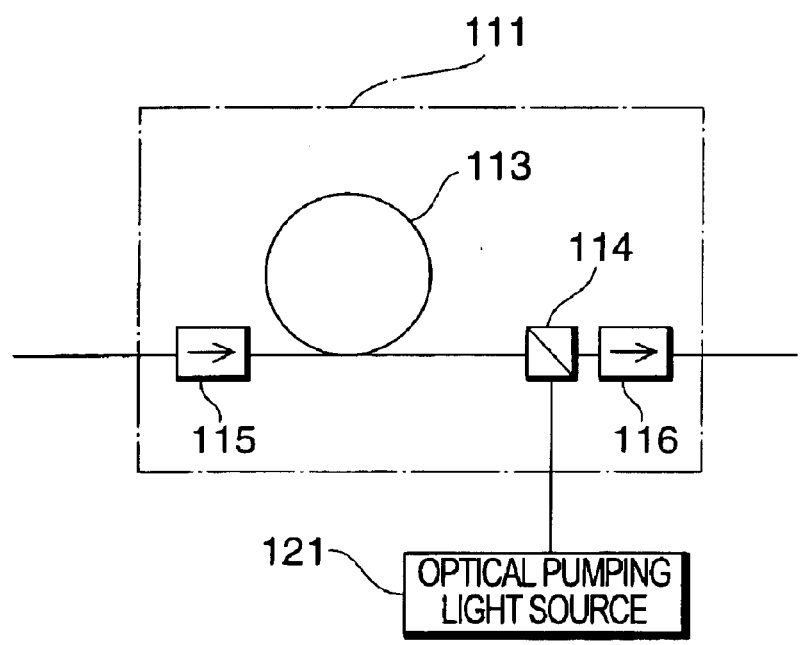
FIG. 2 is an explanatory view of the output-side optical amplification section and optical pumping light source.

FIG. 2 is an explanatory view of the input-side optical amplification section 111 and optical pumping light source 121. The input-side optical amplification section 111 includes an amplification optical fiber 113, optical coupler 114, and optical isolators 115 and 116. The optical coupler 114 sends optical pumping light output from the optical pumping light source 121 to the amplification optical fiber 113 and also passes signal light output from the amplification optical fiber 113. The optical isolators 115 and 116 pass light in the forward direction but do not pass light in the reverse direction.

The amplification optical fiber 113 is an optical waveguide doped with a fluorescent material that can be excited by optical pumping light output from the optical pumping light source 121. The fluorescent material to be doped is preferably a rare earth element and, more preferably, Er. Er is preferably doped because signal light in a 1.55-$\mu$m band can be optically amplified. At this time, the wavelength of optical pumping light to be output from the optical pumping light source 121 and supplied to the amplification optical fiber 113 is preferably 1.48 $\mu$m or 0.98 $\mu$m. The output-side optical amplification section 112 and optical pumping light source 122 have the same arrangement as described above.

Figure 3:
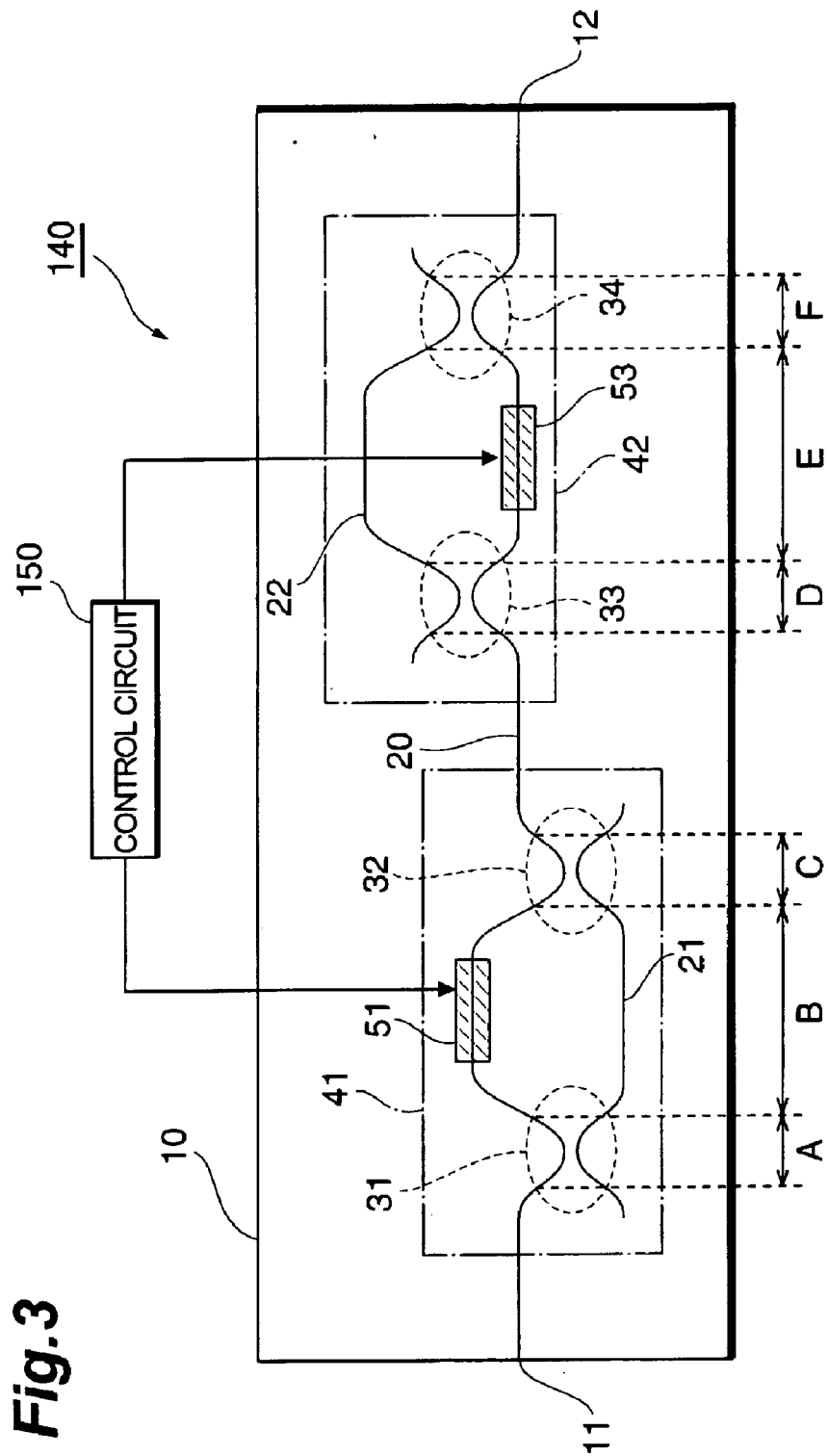
FIG. 3 is an explanatory view of the optical filter.

A preferred example of the optical filter 140 will be described next. FIG. 3 is an explanatory view of the optical filter 140. This optical filter 140 is a planar lightwave circuit formed on a substrate 10 made of, e.g., quartz, and comprises a main optical path 20, first sub optical path 21, second sub optical path 22, heater 51 serving as a first temperature adjustment means, and heater 53 serving as a second temperature adjustment means.

The main optical path 20 is an optical waveguide for guiding light incident on an optical input terminal 11 at one end face of the substrate 10 to an optical output terminal 12 at the other end face of the substrate 10 and causes the light to emerge therefrom. The main optical path 20 has six regions A to F.

The main optical path 20 and first sub optical path 21 are close and optically coupled to each other in the first region A and third region C, thereby forming a first optical coupler 31 and second optical coupler 32. In the second region B, the optical path length of the main optical path 20 is set to be longer than that of the first sub optical path 21, so the two optical paths are spaced apart from each other. Thus, the portion of the main optical path from the first region A to the third region C and the first sub optical path 21 construct an asymmetrical Mach-Zehnder interference circuit. This portion will be referred to as a first Mach-Zehnder interference circuit 41 hereinafter.

Similarly, the main optical path 20 and second sub optical path 22 are close and optically coupled to each other in the fourth region D and sixth region F, thereby forming a third optical coupler 33 and fourth optical coupler 34. In the fifth region E, the optical path length of the main optical path 20 is set to be shorter than that of the first sub optical path 21, so the two optical paths are spaced apart from each other. Thus, the portion of the main optical path from the fourth region D to the sixth region F and the second sub optical path 22 construct an asymmetrical a Mach-Zehnder interference circuit. This portion will be referred to as a second Mach-Zehnder interference circuit 42 hereinafter.

The heater 51 is formed on the second region B of the main optical path 20. This heater 51 adjusts the temperature of the main optical path 20 to adjust the optical path length difference between the main optical path 20 and the first sub optical path 21 in the first Mach-Zehnder interference circuit 41, thereby adjusting the transmission characteristic of the first Mach-Zehnder interference circuit 41. The heater 53 is formed on the fifth region E of the main optical path 20. This heater 53 adjusts the temperature of the main optical path 20 to adjust the optical path length difference between the main optical path 20 and the second sub optical path 22 in the second Mach-Zehnder interference circuit 42, thereby adjusting the transmission characteristic of the second Mach-Zehnder interference circuit 42. The heaters 51 and 53 are controlled by the control circuit 150.

Heaters may be provided on the second region B of the first sub optical path 21 and on the fifth region E of the second sub optical path 22 in place of the heaters 51 and 53. Alternatively, heaters may be provided on both the main optical path and the first and second sub optical paths. Instead of the heaters, Peltier elements for cooling may be provided.

In this optical filter 1, a loss spectrum $L(\lambda)$ [dB] for light input to the optical input terminal 11 and output from the optical output terminal 12 through the main optical path 20 depend on both a transmittance characteristic $T_1(\lambda)$ of the first Mach-Zehnder interference circuit 41 based on optical coupling between the main optical path 20 and the first sub optical path 21 by the optical couplers 31 and 32 and a transmittance characteristic $T_1(\lambda)$ of the second Mach-Zehnder interferometer 42 based on optical coupling between the main optical path 20 and the second sub optical path 22 by the optical couplers 33 and 34.

Generally, a transmittance characteristic $T(\lambda)$ of an asymmetrical Mach-Zehnder interference circuit is given by $$T(\lambda) = 1 - A\sin^2\left(\frac{2\pi(\lambda - \lambda_0)}{\Delta\lambda} + \Delta\phi\right) \quad (1)$$

where $\lambda$[nm] is the wavelength of light, A, $\lambda_0$ [nm], and $\Delta\lambda$ [nm] are constants determined by the structural parameters of the Mach-Zehnder interference circuit, and $\Delta\phi$ is the phase value that can be set by temperature adjustment. A loss spectrum $L(\lambda)$ of the optical filter 1 is given by $$L(\lambda) = -10 \log\{T_1(\lambda) \cdot T_2(\lambda)\} \quad (2)$$

A gradient $dL(\lambda)/d\lambda$ of the loss spectrum $L(\lambda)$ of the optical filter 1 with respect to the wavelength will be simply referred to as a gradient $S(\lambda)$ hereinafter.

When the constants A, $\lambda_0$, and $\Delta\lambda$ of each of the first Mach-Zehnder interference circuit 41 and second Mach-Zehnder interference circuit 42 are appropriately designed, and the phase value $\Delta\phi$ is changed by temperature adjustment by the heaters 51 and 53 while maintaining an almost constant loss $L(\lambda_1)$ at a predetermined wavelength $\lambda_1$ in a predetermined wavelength band, the loss $L(\lambda)$ and gradient $S(\lambda)$ in the wavelength band can be changed. As will be described later, the gradient $S(\lambda)$ of the optical filter 1 has small dependence on the wavelength $\lambda$, and the linearity of the loss $L(\lambda)$ of the optical filter 1 with respect to the wavelength $\lambda$ is excellent.

The present inventor prepared several types of optical filters 1 by changing the structural parameters of the Mach-Zehnder interferometers 41 and 42 and confirmed the variability of the gradient $S(\lambda)$. The result will be described below.

A table below show the structural parameters in examples.

|  |  | Example A | Example B | Example C |
|---|---|---|---|---|
| First Mach-Zehnder Interference Circuit | A | 0.60 | 0.85 | 0.60 |
| | $\lambda_0$ | 1550 | 1550 | 1590 |
| | $\Delta\lambda$ | 200 | 200 | 200 |
| Second Mach-Zehnder Interference Circuit | A | 0.50 | 0.60 | 0.5 |
| | $\lambda_0$ | 1600 | 1600 | 1640 |
| | $\Delta\lambda$ | 200 | 200 | 200 |

In the optical filters of all examples, the optical path lengths in the Mach-Zehnder interference circuits 41 and 42 were set to 12.5$\lambda_0$ and 9.5$\lambda_0$ at reference temperature. Under these conditions, the heaters 51 and 53 were operated to adjust the temperatures in the second region B and fifth region E of the main optical path 20, respectively, thereby changing the phase values $\Delta\phi$ of the Mach-Zehnder interference circuits 41 and 42 within the range of 0 rad to 0.595 rad such that the phase values had opposite signs and equal absolute values.

Figure 4:
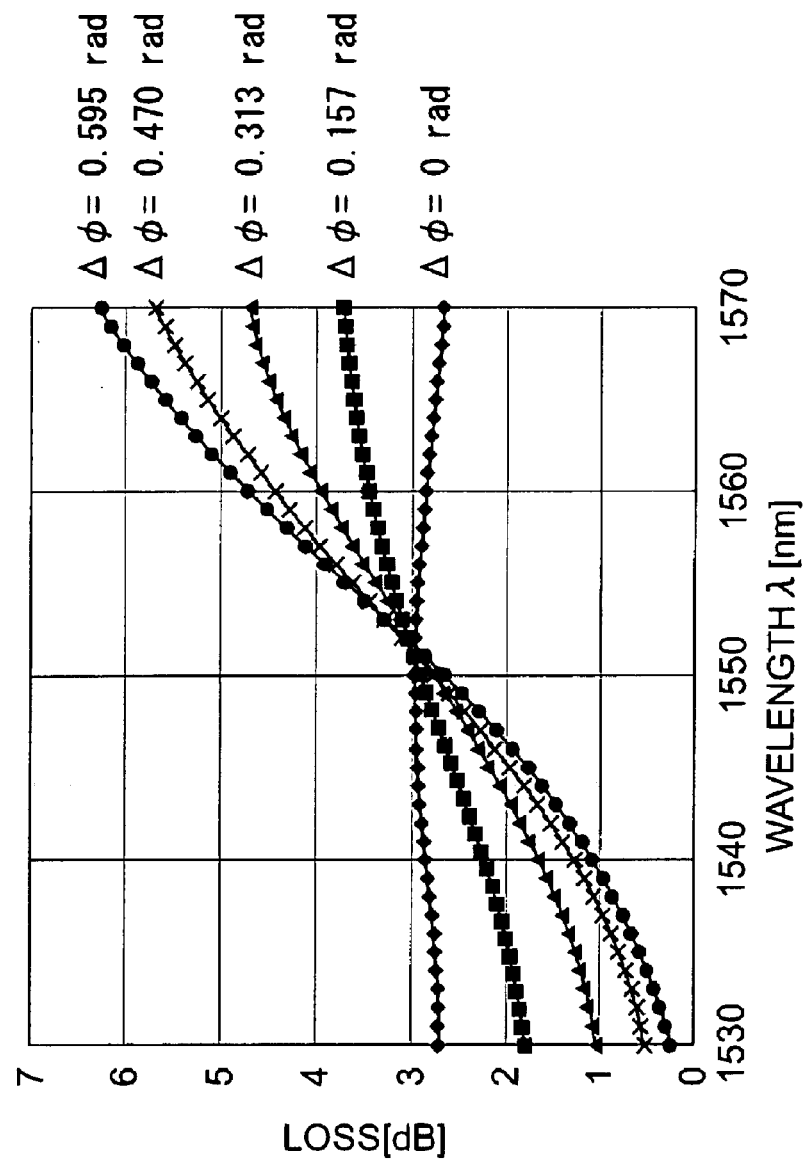
FIGS. 4 to 6 are graphs showing loss spectra obtained when a phase value Δφ was changed in Examples A to C of the optical filter.
Figure 5:
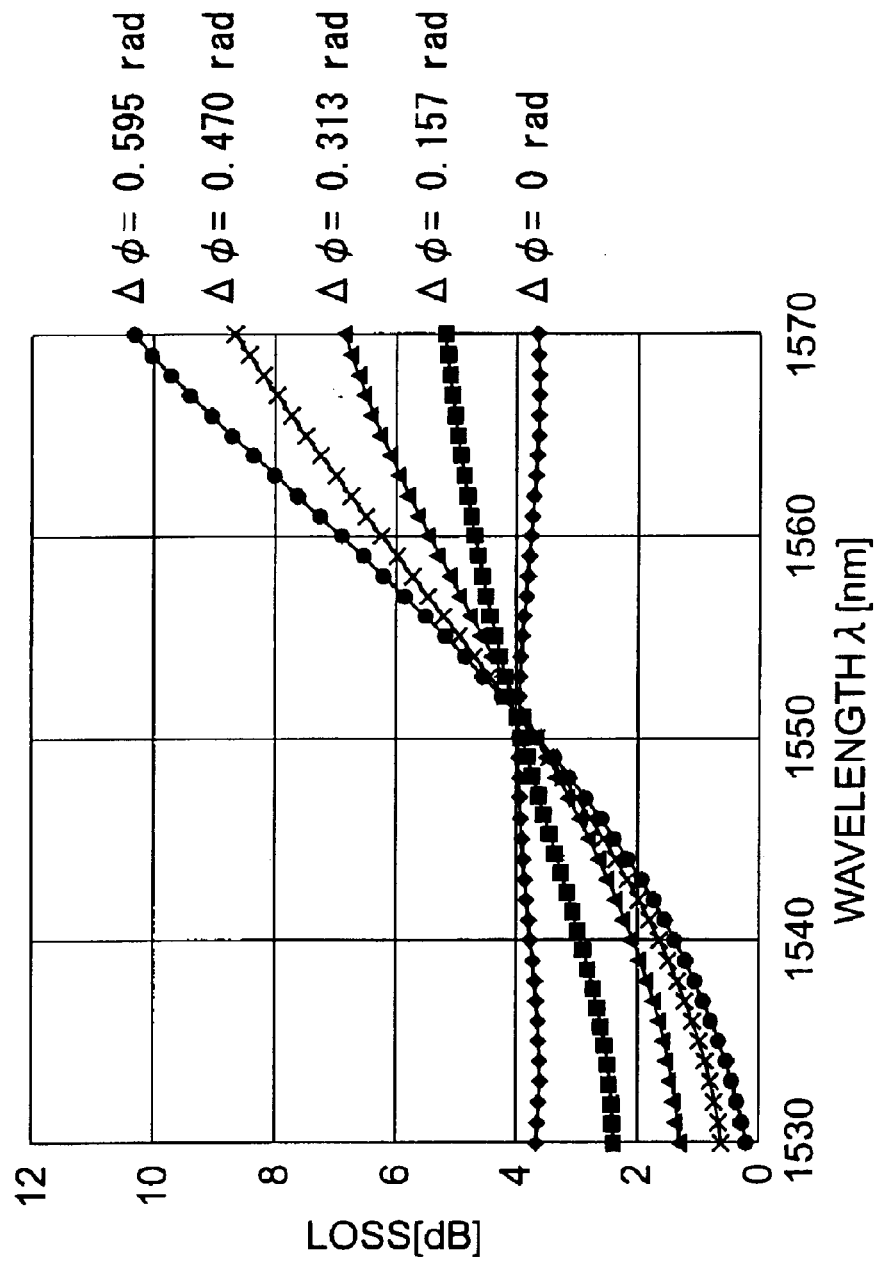
Figure 6:
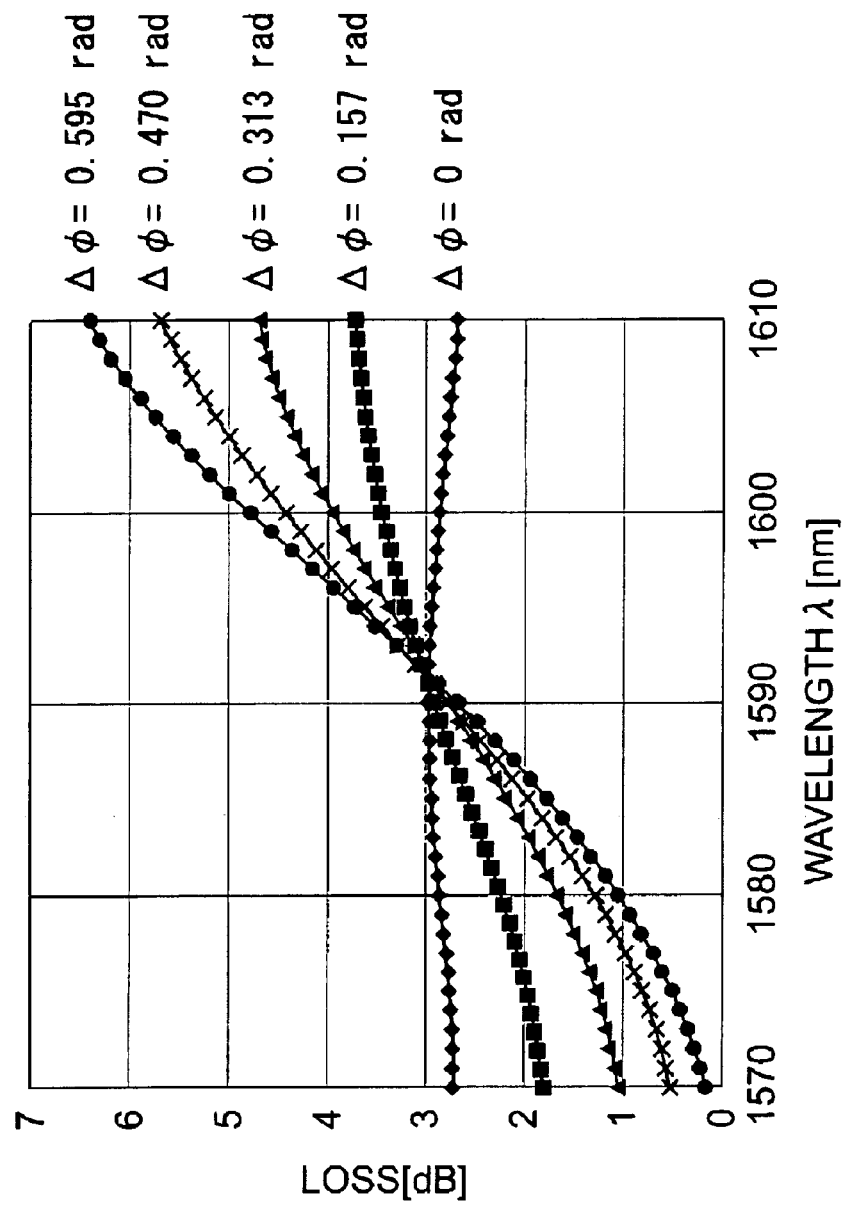

FIGS. 4 to 6 are graphs showing loss spectra obtained when the phase value $\Delta\phi$ was changed in the optical filters of Examples A to C.

As is apparent from FIG. 4, in Example A, the loss ranges from 2.37 to 3.01 dB, i.e., is almost constant near the central wavelength of 1,550 nm in the wavelength band of 1,535 to 1,565 nm, and the gradient $S(\lambda)$ can be set within the range of 0 to 5.05 dB/30 nm in the wavelength band. When the phase value $\Delta\phi$ is 0.595 rad, the maximum value of the deviation from a straight line passing through a point corresponding to a loss of 2.89 dB (@central wavelength: 1,550 nm) is sufficiently as small as ±0.21 dB. Thus, it was confirmed that the gradient $S(\lambda)$ is excellent in linearity.

As is apparent from FIG. 5, in Example B, the loss ranges from 3.65 to 3.98 dB, i.e., is almost constant near the central wavelength of 1,550 nm in the wavelength band of 1,535 to 1,565 nm, and the gradient $S(\lambda)$ can be set within the range of 0 to 10 dB/30 nm in the wavelength band. When the phase value $\Delta\phi$ is 0.314 rad, the maximum value of the deviation from a straight line passing through a point corresponding to a loss of 0.87 dB (@central wavelength: 1,550 nm) is sufficiently as small as ±0.87 dB. Thus, it was confirmed that the gradient $S(\lambda)$ is excellent in linearity.

As is apparent from FIG. 6, in Example C, the loss ranges from 2.73 to 3.01 dB, i.e., is almost constant near the central wavelength of 1,590 nm in the wavelength band of 1,575 to 1,605 nm, and the gradient $S(\lambda)$ can be set within the range of 0 to 5 dB/30 nm in the wavelength band. When the phase value $\Delta\phi$ is 0.595 rad, the maximum value of the deviation from a straight line passing through a point corresponding to a loss of 2.89 dB (@central wavelength: 1,590 nm) is sufficiently as small as ±0.21 dB. Thus, it was confirmed that the gradient $S(\lambda)$ is excellent in linearity.

When the structural parameters of the Mach-Zehnder interference circuits 41 and 42 are appropriately set such that the phase value $\Delta\phi$ is set to 0 by adjusting the temperatures in the second region B and fifth region E of the main optical path 20 to predetermined bias temperatures, the phase value $\Delta\phi$ can be changed within the range of 0 to ±0.595 rad by making the temperatures in the second region B and fifth region E of the main optical path 20 higher than the bias temperatures. In addition, the phase value $\Delta\phi$ can be changed within the range of –0.595 to 0 rad by making the temperatures in the second region B and fifth region E of the main optical path 20 lower than the bias temperatures. When the phase value $\Delta\phi$ is changed within the range of –0.595 to ±0.595 rad, the gradient $S(\lambda)$ can be set within the range of ±a dB/nm in a predetermined wavelength band.

When Peltier elements are used in place of the heaters 51 and 53 to raise or lower the temperatures in the second region B and fifth region E of the main optical path 20, the phase value $\Delta\phi$ can be set not only to a positive value but also to a negative value. This also makes it possible to change the phase value $\Delta\phi$ within the range of –0.595 to +0.595 rad.

As described above, in the optical filter 140 shown in FIG. 3, the loss spectrum for light input to the optical input terminal 11 and output from the optical output terminal 12 through the main optical path 20 is determined by the transmittance characteristic of the first Mach-Zehnder interference circuit 41 based on optical coupling between the main optical path 20 and the first sub optical path 21 by the optical couplers 31 and 32 and the transmittance characteristic of the second Mach-Zehnder interferometer 42 based on optical coupling between the main optical path 20 and the second sub optical path 22 by the optical couplers 33 and 34. This optical filter 140 is preferable because it is integrated on the substrate 10 and has a compact structure and also because of its small insertion loss.

Operation of the optical amplifier 100 according to the first embodiment will be described next, and an optical amplifier control method according to the first embodiment will be described. FIGS. 7A to 7D are views for explaining operation of the optical amplifier 100 according to the first embodiment. As for the loss spectrum (FIG. 7A) of the optical filter 140, as described above, the loss $L(\lambda_1)$ is almost constant at the predetermined wavelength $\lambda_1$ in the wavelength band of signal light, and the gradient $S(\lambda)$ is variable in the wavelength band. The gradient $S(\lambda)$ is controlled by the control circuit 150 which monitors the input signal light power.

Assume that the input signal light power has a predetermined value, and the gain of optical amplification of signal light by the input-side optical amplification section 111 and output-side optical amplification section 112 is almost constant independently of the wavelength (FIG. 7B). In this case, when the input signal light power becomes smaller than the predetermined value, the gain of optical amplification of signal light by the input-side optical amplification section 111 and output-side optical amplification section 112 is controlled by the control circuit 150 and becomes large. As a consequence, the longer the wavelength is, the smaller the gain becomes: the gain has wavelength dependence (FIG. 7C). At this time, however, the gradient $S(\lambda)$ of the optical filter 140 is controlled by the control circuit 150. The longer the wavelength is, the smaller the loss is set. Hence, the wavelength dependence of gain of the input-side optical amplification section 111 and output-side optical amplification section 112 is canceled by the wavelength dependence of loss of the optical filter 140. As a result, the gain characteristic of the entire optical amplifier 100 becomes almost constant independently of the wavelength, and the gain flatness is maintained (FIG. 7D).

As described above, in this embodiment, even when the input signal light power varies, the output signal light power can be maintained at a predetermined target value, and the gain flatness of the entire optical amplifier 100 can be maintained. In addition, since the loss of the optical filter 140 is almost constant at a predetermined wavelength in the wavelength band of signal light, the noise factor does not degrade. In this embodiment, the optical filter 140 may be located on the output side of the output-side optical amplification section 112.

Second Embodiment

Figure 8:
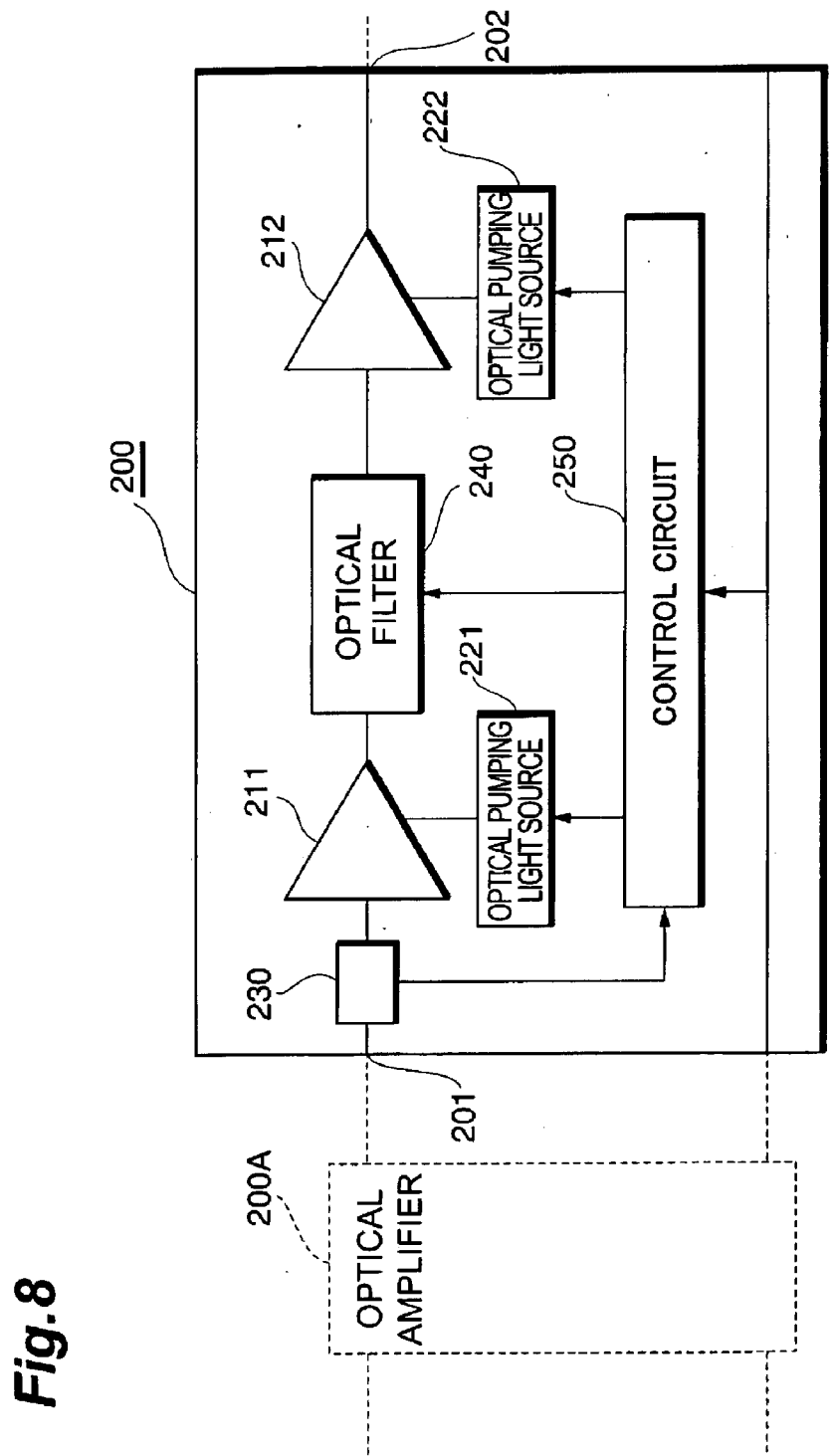

FIG. 8 is a schematic view showing the arrangement of an optical amplifier 200 according to the second embodiment of the present invention. FIG. 8 also illustrates an optical amplifier 200A provided on the input side of the optical amplifier 200. In the optical amplifier 200 according to this embodiment, an optical coupler 230, input-side optical amplification section 211, optical filter 240, and output-side optical amplification section 212 are sequentially connected in series between an optical input terminal 201 and an optical output terminal 202. The optical amplifier 200 also has optical pumping light sources 221 and 222 for supplying optical pumping light to the input-side optical amplification section 211 and output-side optical amplification section 212, respectively, and a control circuit 250 for controlling the optical pumping light sources 221 and 222 and the loss spectrum of the optical filter 240.

The arrangement of each element is the same as in the first embodiment except the control circuit 250. The control circuit 250 detects the power of input signal light demultiplexed by the optical coupler 230, as in the first embodiment, and also receives information related to the power of signal light output from the optical amplifier 200A on the input side, which is transmitted from the optical amplifier 200A on the input side. The control circuit 250 calculates the necessary gain on the basis of the output signal light power of the input-side optical amplifier 200A and the input signal light power of the optical amplifier of its own and controls the powers of optical pumping light to be output from the optical pumping light sources 221 and 222 such that the power of output signal light has a predetermined target value. The control circuit 250 also controls the loss spectrum of the optical filter 240 on the basis of the necessary gain.

More specifically, when the necessary gain becomes large, the gain of optical amplification of signal light by the input-side optical amplification section 211 and output-side optical amplification section 212 becomes smaller as the wavelength becomes long; the gain has wavelength dependence. At this time, however, the gradient $S(\lambda)$ of the optical filter 240 is controlled by the control circuit 250 so that the longer the wavelength is, the smaller the loss becomes. Hence, the wavelength dependence of gain of the input-side optical amplification section 211 and output-side optical amplification section 212 is canceled by the loss spectrum of the optical filter 240. As a result, the gain characteristic of the entire optical amplifier 200 becomes almost constant independently of the wavelength, and the gain flatness is maintained.

As described above, in this embodiment as well, even when the input signal light power varies, the output signal light power can be maintained at a target value, and the gain flatness of the entire optical amplifier 200 can be maintained. In addition, since the loss of the optical filter 240 is almost constant at a predetermined wavelength in the wavelength band of signal light, the noise factor does not degrade. In this embodiment, the optical filter 240 may be located on the output side of the output-side optical amplification section 212.

Third Embodiment

Figure 9:
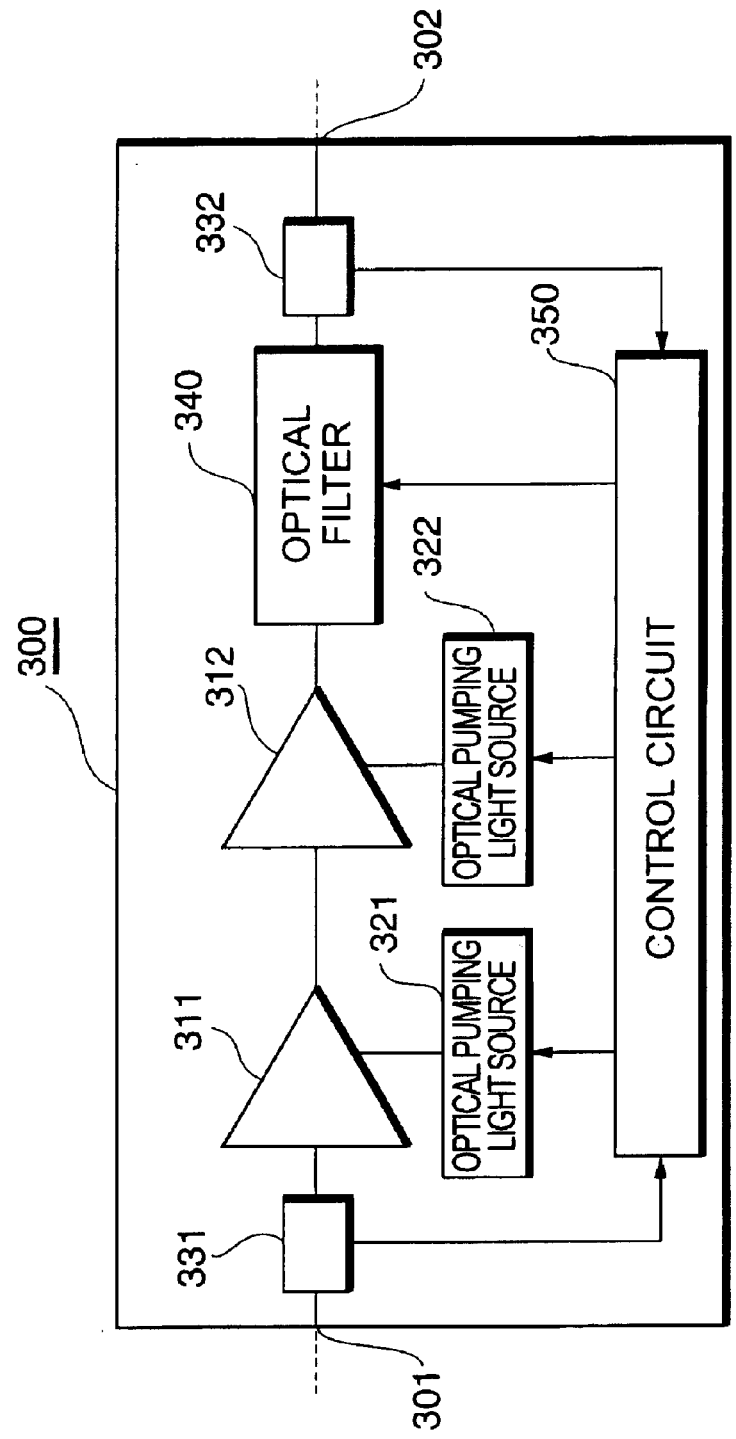

FIG. 9 is a schematic view showing the arrangement of an optical amplifier 300 according to the third embodiment of the present invention. In the optical amplifier 300 according to this embodiment, an optical coupler 331, input-side optical amplification section 311, output-side optical amplification section 312, optical filter 340, and optical coupler 332 are sequentially connected in series between an optical input terminal 301 and an optical output terminal 302. The optical amplifier 300 also has optical pumping light sources 321 and 322 for supplying optical pumping light to the input-side optical amplification section 311 and output-side optical amplification section 312, respectively, and a control circuit 350 for controlling the optical pumping light sources 321 and 322 and the loss spectrum of the optical filter 340.

The arrangement of each constituent element is the same as in the first embodiment, and a detailed description thereof will be omitted. As characteristic features of this embodiment, the optical coupler 332 is arranged on the light output side to supply a demultiplexed part of output light to the control circuit 350, and the optical filter 340 is arranged on the downstream side of the multi-stage optical amplifiers 311 and 312.

The control circuit 350 detects the power of input signal light demultiplexed by the optical coupler 331 and detects the power of output signal light demultiplexed by the optical coupler 332. The control circuit 350 controls the powers of optical pumping light to be output from the optical pumping light sources 321 and 322 such that the power of output signal light has a predetermined target value. The control circuit 350 calculates the gain on the basis of the output signal light power and input signal light power and controls the loss spectrum of the optical filter 340 on the basis of the gain.

More specifically, when the gain becomes large, the gain of optical amplification of signal light by the input-side optical amplification section 311 and output-side optical amplification section 312 becomes smaller as the wavelength becomes long; the gain has wavelength dependence. At this time, however, the gradient S(λ) of the optical filter 340 is controlled by the control circuit 350 so that the longer the wavelength is, the smaller the loss becomes. Hence, the wavelength dependence of gain of the input-side optical amplification section 311 and output-side optical amplification section 312 is canceled by the loss spectrum of the optical filter 340. As a result, the gain characteristic of the entire optical amplifier 300 becomes almost constant independently of the wavelength, and the gain flatness is maintained.

As described above, in this embodiment as well, even when the input signal light power varies, the output signal light power can be maintained at a target value, and the gain flatness of the entire optical amplifier 300 can be maintained. In addition, since the loss of the optical filter 340 is almost constant at a predetermined wavelength in the wavelength band of signal light, the noise factor does not degrade. In this embodiment, the optical filter 340 may be located between the input-side optical amplification section 311 and the output-side optical amplification section 312.

Fourth Embodiment

FIG. 10A is a schematic view showing the arrangement of an optical amplifier 400 according to the fourth embodiment of the present invention. In the optical amplifier 400 according to this embodiment, an input-side optical amplification section 411, output-side optical amplification section 412, and optical filter 440 are sequentially connected in series between an optical input terminal 401 and an optical output terminal 402. The optical amplifier 400 also has optical pumping light sources 421 and 422 for supplying optical pumping light to the input-side optical amplification section 411 and output-side optical amplification section 412, respectively, a spectrum monitor device 460 for monitoring the powers of signal light components with respective wavelengths, which are output from the optical output terminal 402, and a control circuit 450 for controlling the optical pumping light outputs from the optical pumping light sources 421 and 422 and the loss spectrum of the optical filter 440.

As a characteristic feature of this embodiment, the spectrum monitor device 460 is used. The arrangements of the remaining elements are the same as in the above embodiments, and a detailed description thereof will be omitted.

Part of light output from the optical output terminal 402 is demultiplexed and guided to the spectrum monitor device 460, or light output from a second sub optical path 22 of the optical filter 440 having the structure shown in FIG. 3 is guided to the spectrum monitor device 460, and the guided light is demultiplexed by the spectrum monitor device 460. This spectrum monitor device 460 can be implemented by, e.g., an AWG (Arrayed-waveguide Grating). In this case, the spectrum monitor device 460 can be formed on a common substrate together with the optical filter 440 having the structure shown in FIG. 3, so the entire device can be dowrisized.

The control circuit 450 controls the power of output signal light component with respective wavelengths, which are demultiplexed by the spectrum monitor device 460. The control circuit 450 controls the powers of optical pumping light to be output from the optical pumping light sources 421 and 422 such that the power of output signal light has a predetermined target value. The control circuit 450 also controls the loss spectrum of the optical filter 440 on the basis of any deviation between the powers of output signal light components with respective wavelengths such that the deviation becomes small.

Figure 11:
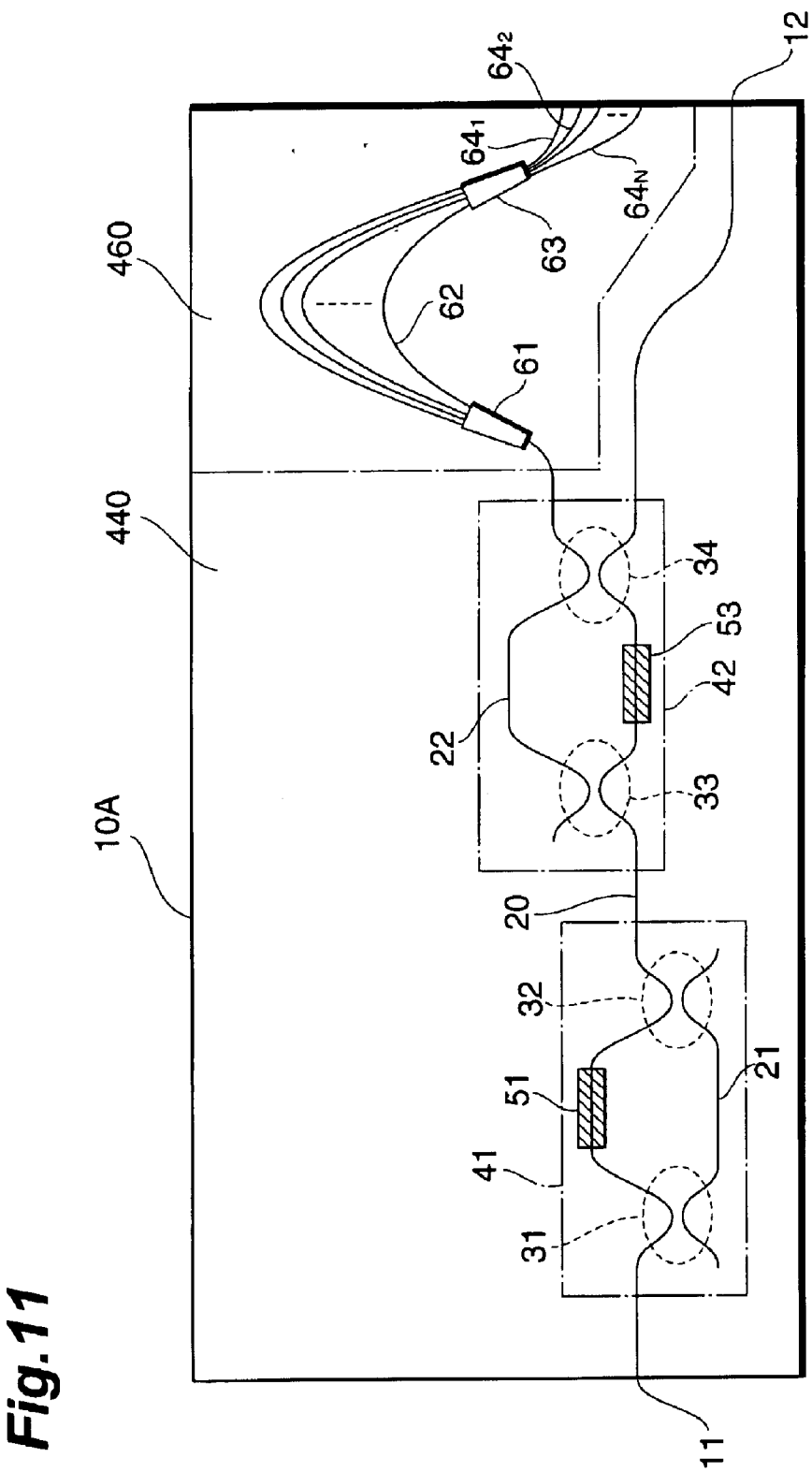
FIG. 11 is an explanatory view of an optical filter and spectrum monitor device in the third embodiment.

Preferred examples of the optical filter 440 and spectrum monitor device 460 will be described. FIG. 11 is an explanatory view of the optical filter 440 and spectrum monitor device 460. The optical filter 440 and spectrum monitor device 460 are formed on a common substrate 10A. The optical filter 440 has the same structure as that shown in FIG. 3. The spectrum monitor device 460 is formed from an AWG formed on the substrate 10A. Mote specifically, the spectrum monitor device 460 has an input-side slab waveguide 61, array waveguide section 62 having a plurality of channel waveguides, output-side slab waveguide 63, and output-side channel waveguides $64_1$ to $64_N$.

Light output from the second sub optical path 22 of the optical filter 440 is input to the input-side slab waveguide

61. The light is demultiplexed and output to the channel waveguides of the array waveguide section 62. The plurality of channel waveguides of the array waveguide section 62 have different optical path lengths from the input-side slab waveguide 61 to the output-side slab waveguide 63 and give different phases to the light to be guided. The output-side slab waveguide 63 receives light from each of the plurality of channel waveguides of the array waveguide section 62 and outputs the light to each of the output-side channel waveguides $64^1$ to $64_N$.

The light components output to the output-side channel waveguides $64_1$ to $64_N$ are signal light components having respective wavelengths, which are obtained by demultiplexing the light output from the second sub optical path 22 of the optical filter 440. The control circuit 450 detects the powers of signal light components having respective wavelengths, which are output to the output-side channel waveguides $64_1$ to $64_N$ of the spectrum monitor device 460, and controls the loss gradient of the optical filter 440 such that the deviation between the powers of signal light components having respective wavelengths becomes small. The control circuit 450 may control the loss gradient of the optical filter 440 such that the deviation between powers of two signal light components having respective wavelengths (e.g., the maximum wavelength and minimum wavelength) in the signal light components having respective wavelengths, which are demultiplexed by the spectrum monitor device 460.

Figure 10B:
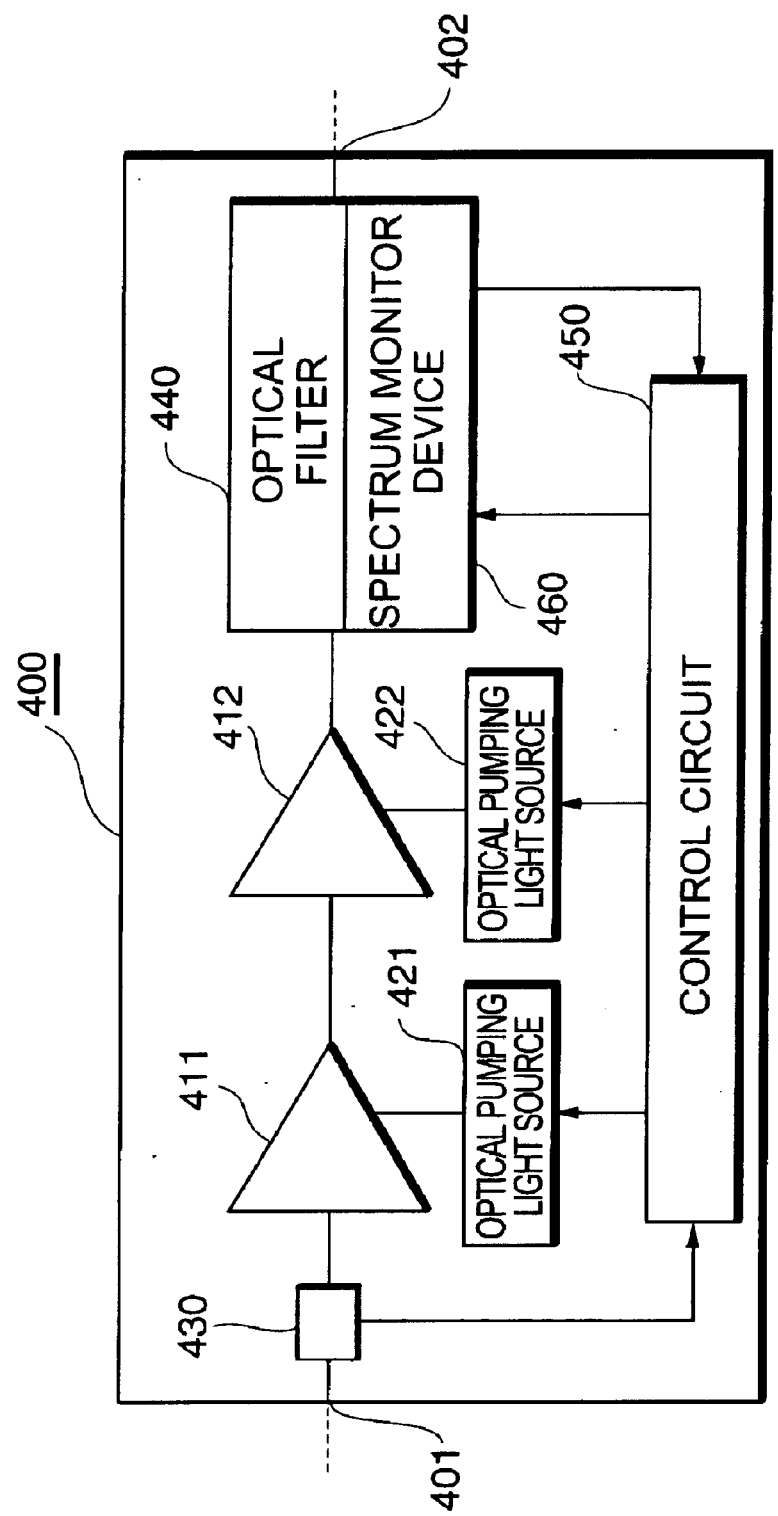
FIG. 10B is a schematic view showing the arrangement of a modification of the fourth embodiment.

FIG. 10B shows a modification to the fourth embodiment. A difference from the fourth embodiment shown in FIG. 10A is that an optical coupler 430 for demultiplexing a monitor light component in the input signal light is arranged on the optical input terminal 401 side. Monitor light contains, e.g., information related to the shortest wavelength and longest wavelength in the sent multiplexed signal light. The control circuit 450 reads the pieces of information and determines the two wavelengths for which the power deviation is to be obtained.

As described above, in this embodiment as well, even when the input signal light power varies, the output signal light power can be maintained at a predetermined target value, and the gain flatness of the entire optical amplifier 400 can be maintained. In addition, since the loss of the optical filter 440 is almost constant at a predetermined wavelength in the wavelength band of signal light, the noise factor does not degrade. Furthermore, in this embodiment, since the loss gradient of the optical filter 440 is feedback-controlled, stable operation is possible.

Fifth Embodiment

Figure 12:
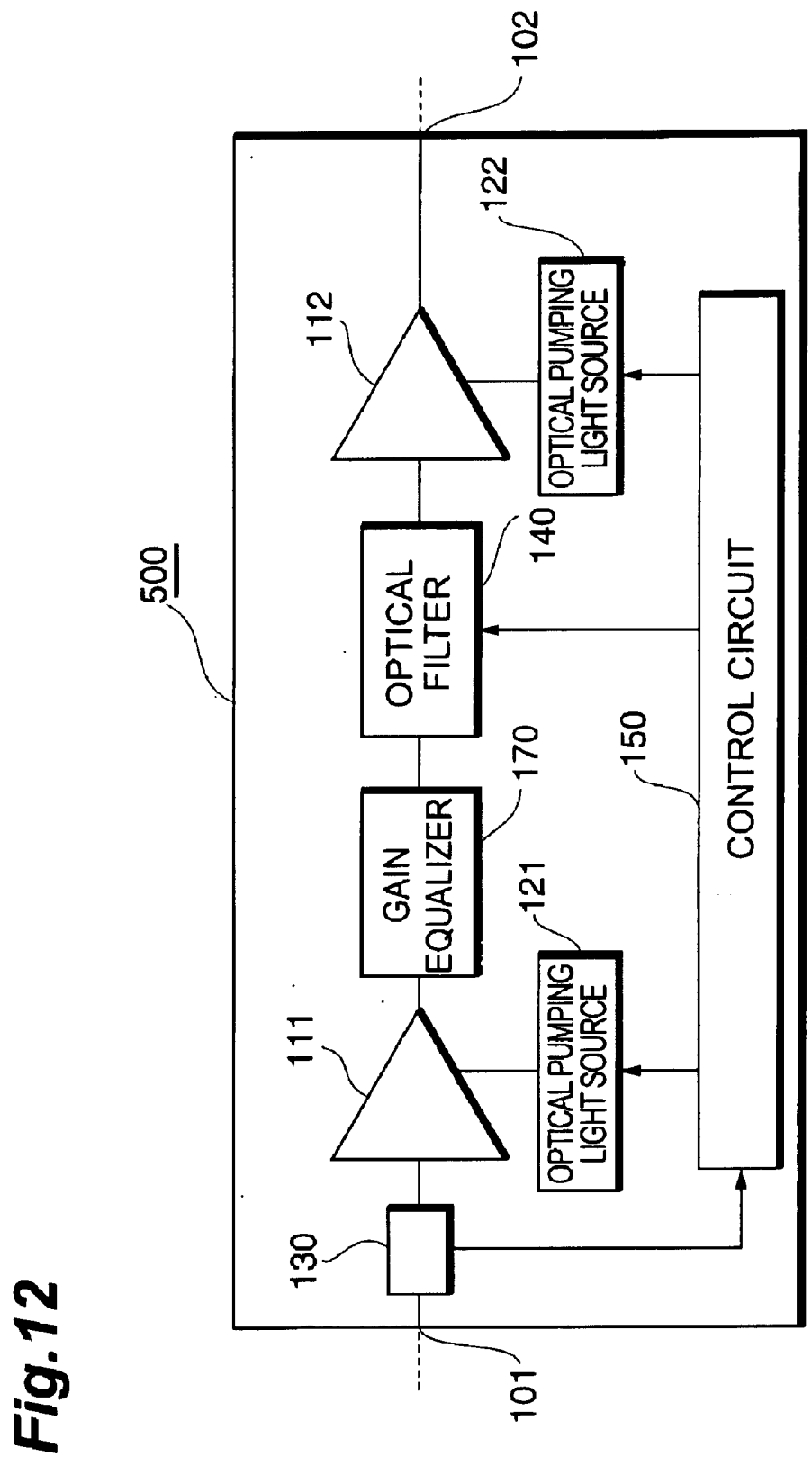
FIG. 12 is a schematic view showing the arrangement of an optical amplifier according to the fifth embodiment of the present invention.

FIG. 12 a schematic view showing the arrangement of an optical amplifier 500 according to the fifth embodiment of the present invention. In the optical amplifier 500 according to this embodiment, a gain equalizer 170 is inserted between an input-side optical amplification section 111 and an optical filter 140 of the optical amplifier 100 according to the first embodiment. The gain equalizer 170 equalizes gain wavelength dependence unique to the input-side optical amplification section 111 and output-side optical amplification section 112. This gain equalizer 170 can be implemented by, e.g., an optical fiber grating element having index modulation in the core of an optical fiber or an etalon filter having a Fabry-Perot resonator structure.

The operation of the optical amplifier 500 according to the fifth embodiment, i.e., an optical amplification method according to the fifth embodiment will be described text.

Figure 13A:
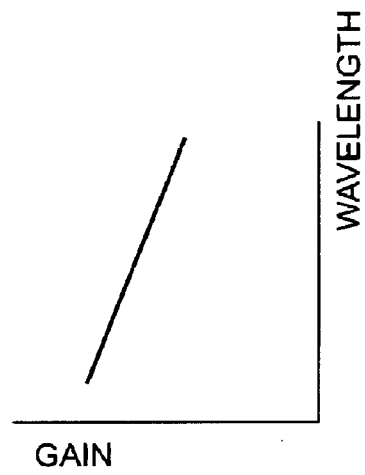
FIGS. 13A to 13C are views for explaining its operation.
Figure 13B:
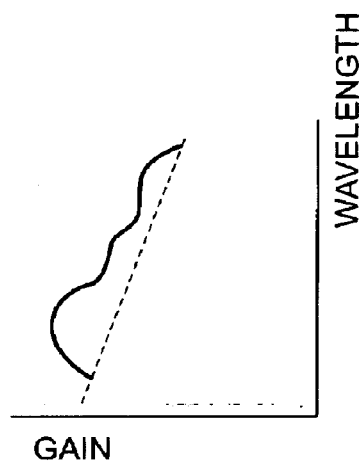
Figure 13C:
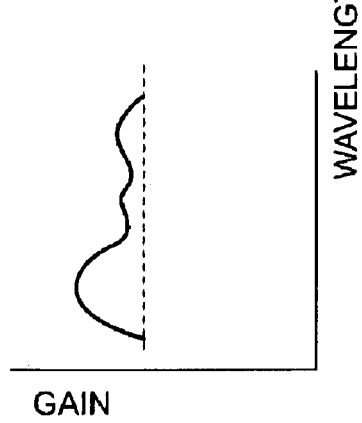

FIGS. 13A to 13C are views for explaining the operation of the optical amplifier 500 according to the fifth embodiment. Even when the input signal light power has a predetermined value, the gain spectrum of the input-side optical amplification section 111 and output-side optical amplification section 112 is not strictly constant and has a gain wavelength dependence unique to the input-side optical amplification section 111 and output-side optical amplification section 112 (FIG. 13A). The gain equalizer 170 has a loss spectrum having the same shape as that of the gain spectrum of the input-side optical amplification section 111 and output-side optical amplification section 112 at this time. Hence, the spectrum of output light is flat.

When the input signal light power has a value smaller than the predetermined value, the gain of optical amplification of signal light by the input-side optical amplification section 111 and output-side optical amplification section 112 is controlled by a control circuit 150 and becomes large. Consequently, the longer the wavelength becomes, the smaller the gain becomes, so the wavelength dependence of gain changes (FIG. 13B). At this time, however, the loss spectrum of the optical filter 140 is controlled and set by the control circuit 150 such that the longer the wavelength is, the smaller the gain becomes.

For the light output from the input-side optical amplification section 111 and output-side optical amplification section 112, the gain wavelength dependence unique thereto is equalized by the gain equalizer 170, so the gain (dB) is adjusted to linearly change with respect to the wavelength, as shown in FIG. 13C. After that, the remaining wavelength dependence of gain is canceled by the loss spectrum of the optical filter 140. As a result, the gain characteristic of the entire optical amplifier 500 is almost constant independently of the wavelength, and its flatness is maintained.

As described above, in this embodiment as well, even when the input signal light power varies, the output signal light power can be maintained at a predetermined target value, and the gain flatness of optical amplifier 500 can be maintained. Especially in this embodiment, since the gain equalizer 170 is provided in addition to the optical filter 140, the gain flatness of the entire optical amplifier 500 is excellent. In addition, since the loss of the optical filter 140 is almost constant at a predetermined wavelength in the wavelength band of signal light, the noise factor does not degrade. In this embodiment, one or both of the optical filter 140 and gain equalizer 170 may be located on the output side of the output-side optical amplification section 112. The same effect as described above can be obtained even when a gain equalizer is inserted in any one of the optical amplifiers according to the second to fourth embodiments.

Sixth Embodiment

Figure 14A:
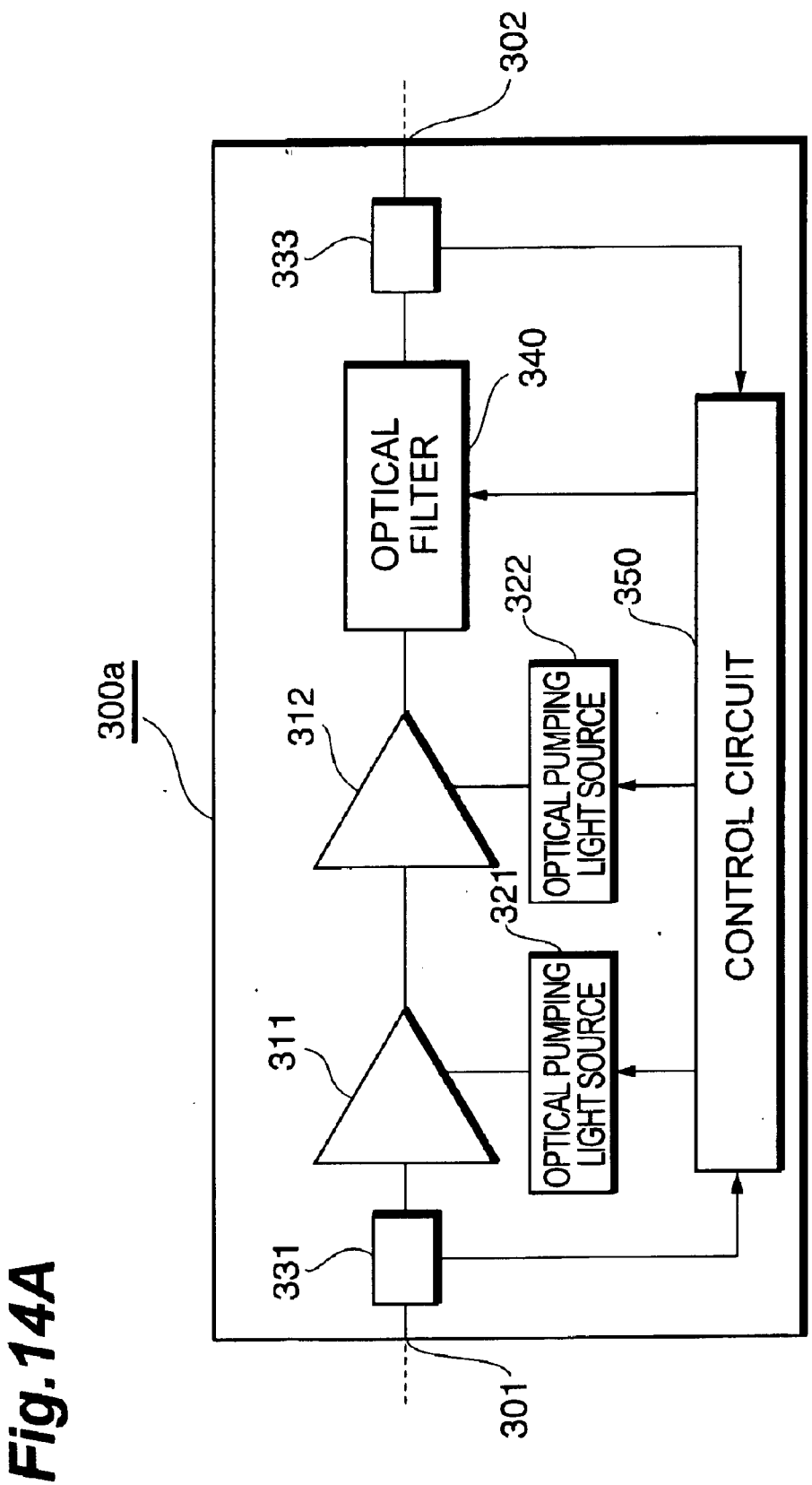
FIGS. 14A and 14B are schematic views showing the arrangements of an optical amplifier according to the sixth embodiment of the present invention and its modification, respectively.

FIG. 14A is a schematic view showing the arrangement of an optical amplifier 300*a* according to the sixth embodiment of the present invention. The optical amplifier 300*a* according to this embodiment is different from the optical amplifier 300 according to the third embodiment shown in FIG. 9 only in that an ASE light level detector 333 is arranged in place of the optical coupler 332 at the final stage.

The ASE light level detector 333 detects the level of spontaneous emission light (ASE light) having respective wavelengths located outside the two ends of a predetermined wavelength band of signal light output from an optical filter 340. A control circuit 350 adjusts the loss spectrum of the optical filter 340 such that the difference in the detected ASE light level between the longest wavelength side and the shortest wavelength side is maintained at a predetermined value. Use of the level difference in ASE light advantageously facilitates control.

When monitor light having information related to the shortest wavelength and longest wavelength in multiplexed signal light is sent together with the multiplexed signal light, monitor light demultiplexed by an optical coupler 331 is received by the control circuit 350 to read the pieces of information, and wavelengths for which the ASE light levels are to be detected by the ASE light level detector 333 are set to those outside the read shortest wavelength and longest wavelength. In this case, even when the shortest wavelength and longest wavelength in the multiplexed signal light are not constant, stable optical amplification can be performed.

Figure 14B:
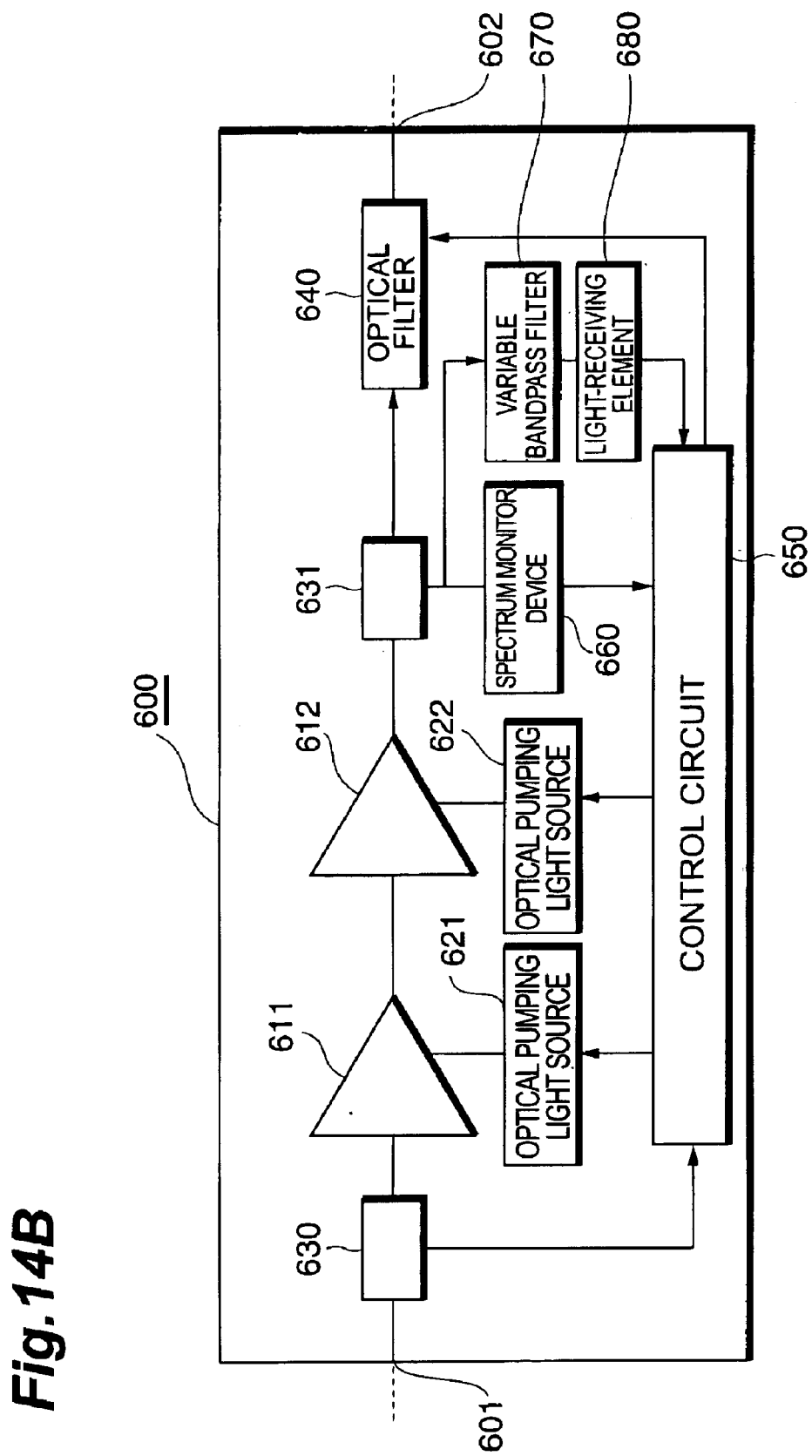

FIG. 14B is a schematic view showing the arrangement of an optical amplifier 600 as a modification to the sixth embodiment of the present invention. More specifically, an optical coupler 630, input-side optical amplification section 611, output-side optical amplification section 612, optical coupler 631, and optical filter 640 are sequentially connected in series between an optical input terminal 601 and an optical output terminal 602. The optical amplifier 600 also has optical pumping light sources 621 and 622 for supplying optical pumping light to the input- and output-side optical amplification sections 611 and 112, respectively, and a control circuit 650 for controlling the light powers of the optical pumping light sources 621 and 622 and the loss spectrum of the optical filter 640. Light demultiplexed by the optical coupler 631 is guided to a spectrum monitor device 660 and variable bandpass filter 670. The light transmitted through the variable bandpass filter 670 is detected by a light-receiving element 680. The arrangements of the amplification sections 611 and 612 and the optical filter 640 are the same as in the first embodiment, and a detailed description thereof will be omitted.

In this embodiment, the wavelengths of light with the shortest wavelength and light with the longest wavelength in the signal light are detected by the spectrum monitor device 660. By controlling the variable bandpass filter 670, the ASE light levels on the shorter wavelength side of the detected shortest wavelength and on the longer wavelength side of the detected longest wavelength are detected by the light-receiving element 680. The control circuit 650 adjusts the loss spectrum of the optical filter 640 such that the difference in detected ASE light levels between the longer wavelength side and the shorter wavelength side is maintained at a predetermined value. This also facilitates control.

Seventh Embodiment

Figure 15:
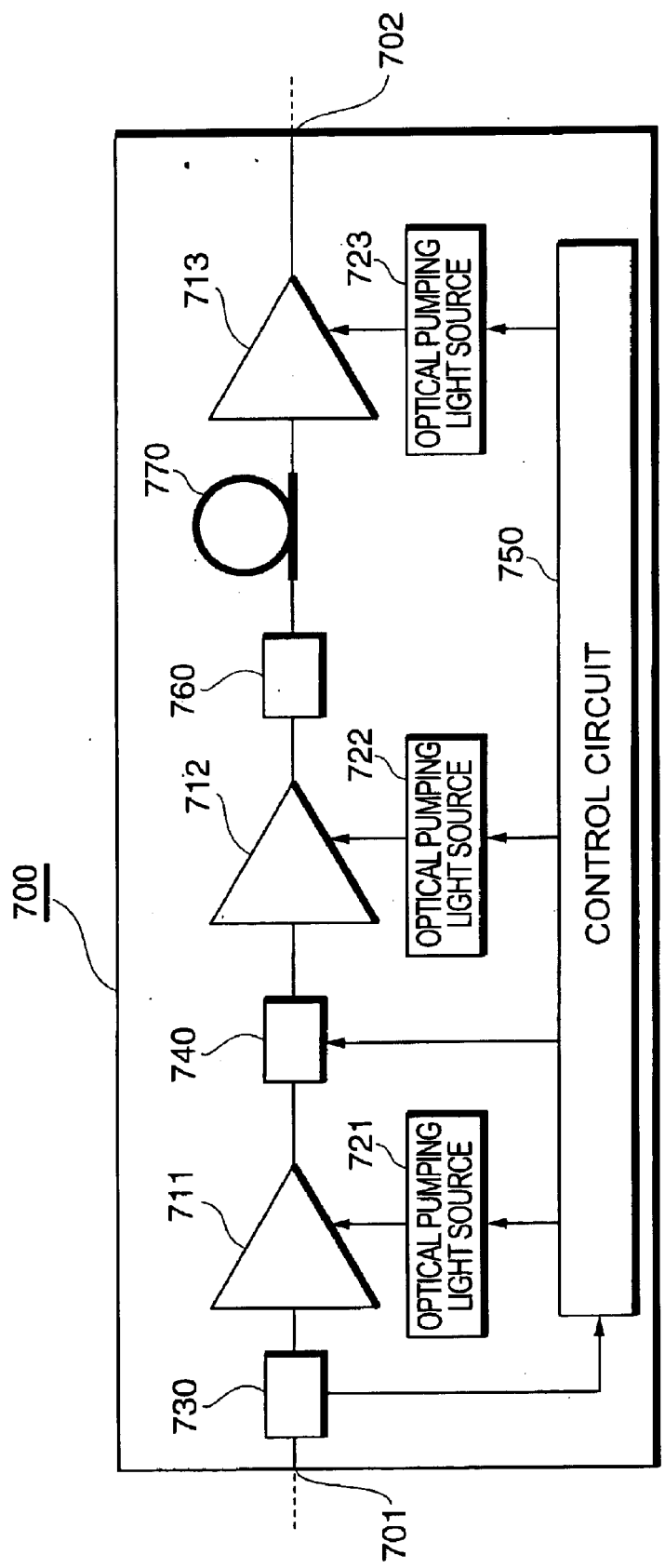
FIG. 15 is a schematic view showing the arrangement of an optical amplifier according to the seventh embodiment of the present invention.

FIG. 15 is a schematic view showing the arrangement of an optical amplifier 700 according to the seventh embodiment of the present invention. This optical amplifier 700 incorporates a DCF (Dispersion compensating Fiber) 770.

More specifically, an optical coupler 730, input-side optical amplification section 711, optical filter 740, intermediate optical amplification section 712, gain equalizer 760, DCF 770, and output-side optical amplification section 713 are sequentially connected in series between an optical input terminal 701 and an optical output terminal 702. The optical amplifier 700 also has optical pumping light sources 721 to 723 for supplying optical pumping light to the input-side, intermediate, and output-side optical amplification sections 711 to 713, respectively, and a control circuit 750 for controlling the light powers of the optical pumping light sources 721 to 723 and the loss spectrum of the optical filter 740. The arrangements of the optical amplification sections 711 to 713 and optical filter 740 are the same as in the first embodiment, and a detailed description thereof will be omitted.

To confirm the noise characteristic improving effect of the optical amplifier 700 according to this embodiment using an optical filter capable of adjusting the loss spectrum, the present inventor conducted comparative experiments for a case wherein a conventional variable optical attenuator for adjusting only the total loss ratio is used as an optical filter.

In the experiments, the noise characteristic with respect to the input level in a dynamic range of 16 dB from −28 dbm/ch to −12 dbm/ch was measured. When the variable optical attenuator is used, it is generally difficult to cope with an input dynamic range of 16 dB. Hence, measurement was performed by dividing the range into two parts: −28 dbm/ch to −20 dbm/ch and −20 dbm/ch to −12 dbm/ch, and also for a combination thereof.

Figure 16:
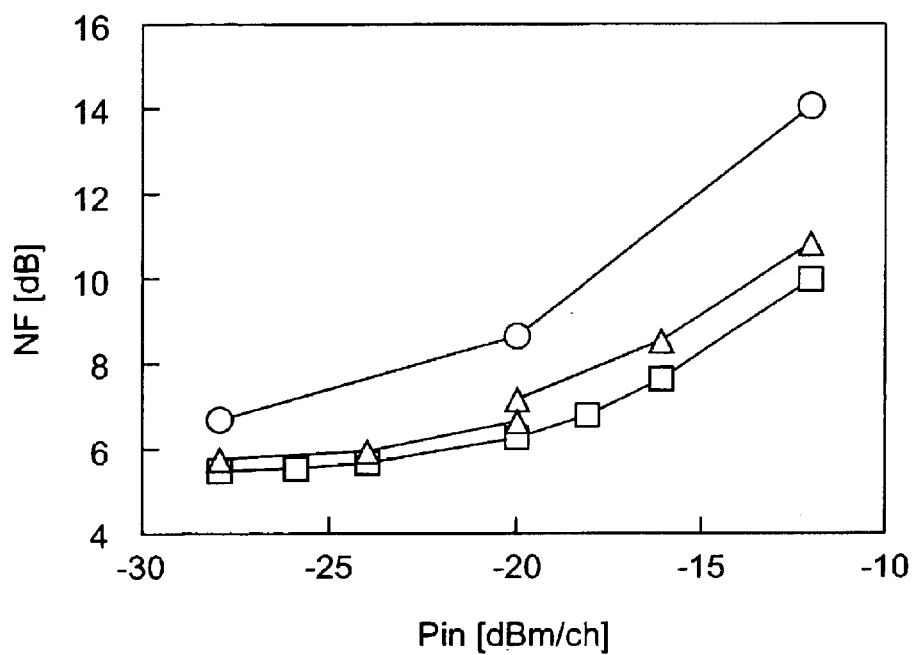
FIG. 16 is a graph which compares the noise characteristic of the seventh embodiment with that of a conventional optical amplifier.

FIG. 16 shows the measurement results. Referring to FIG. 16, ○ indicates a noise characteristic with respect to the input level, which was obtained when the total range was amplified by one type of optical amplifier using the variable optical attenuator, ▲ indicates a noise characteristic with respect to the input level, which was obtained when the total range was divided and amplified by two types of optical amplifiers using the variable optical attenuator, and Δ indicates a noise characteristic with respect to the input level, which was obtained when the total range was amplified by the optical amplifier according to the seventh embodiment of the present invention.

It was confirmed that the optical amplifier according to the present invention has an effect for improving the noise characteristic at all input levels and widening the adaptable dynamic range.

Figure 17:
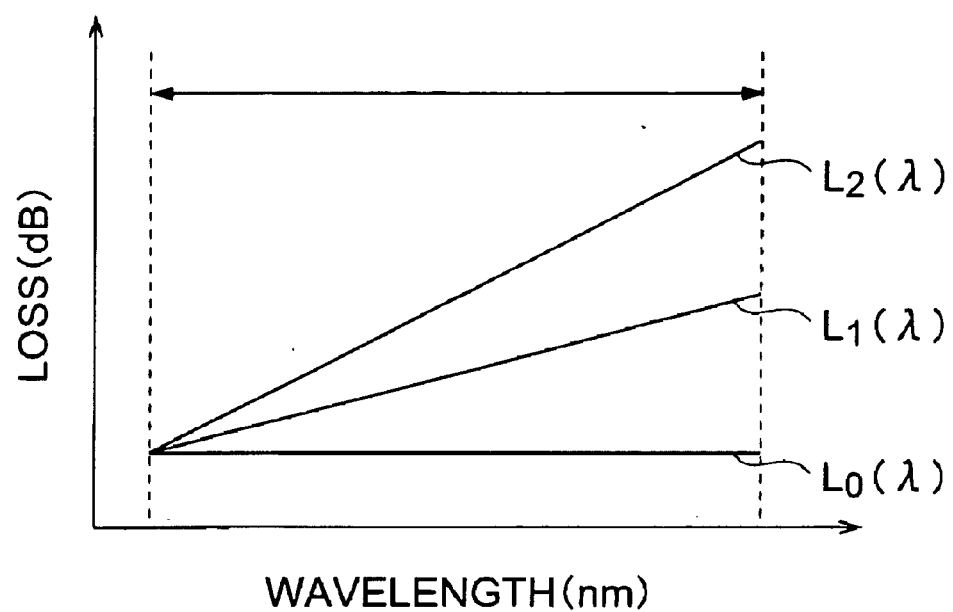
FIG. 17 is a view for explaining the loss spectrum of a modification of an optical filter used in the optical amplifier according to the present invention.

A modification of the optical filter will be described next. Each of the optical filters having the loss spectra shown in FIGS. 4 to 6 has an almost constant loss near the central wavelength of the use wavelength band. However, the wavelength $\lambda_1$ at which the loss becomes almost constant may be shifted to the shorter wavelength side or longer wavelength side. For an optical filter having a loss spectrum shown in FIG. 17, the wavelength $\lambda_1$ is located at the shortest wavelength in the wavelength band. The loss spectrum can be changed between and $L_0(\lambda)$ and $L_2(\lambda)$. When the power of light input to the optical filter is maximum, the loss spectrum is adjusted to $L_2(\lambda)$. When the power of input light is minimum, the loss spectrum is adjusted to $L_0(\lambda)$ at which the loss becomes constant independently of the wavelength. For intermediate power, the loss spectrum is adjusted to $L_1(\lambda)$. Thus, degradation in noise factor especially in the short wavelength region can be suppressed. When the input power is minimum, the transmittance is maximized. Hence, the noise characteristic improving effect becomes conspicuous especially when the power of input light is small.

Eighth Embodiment

Figure 18:
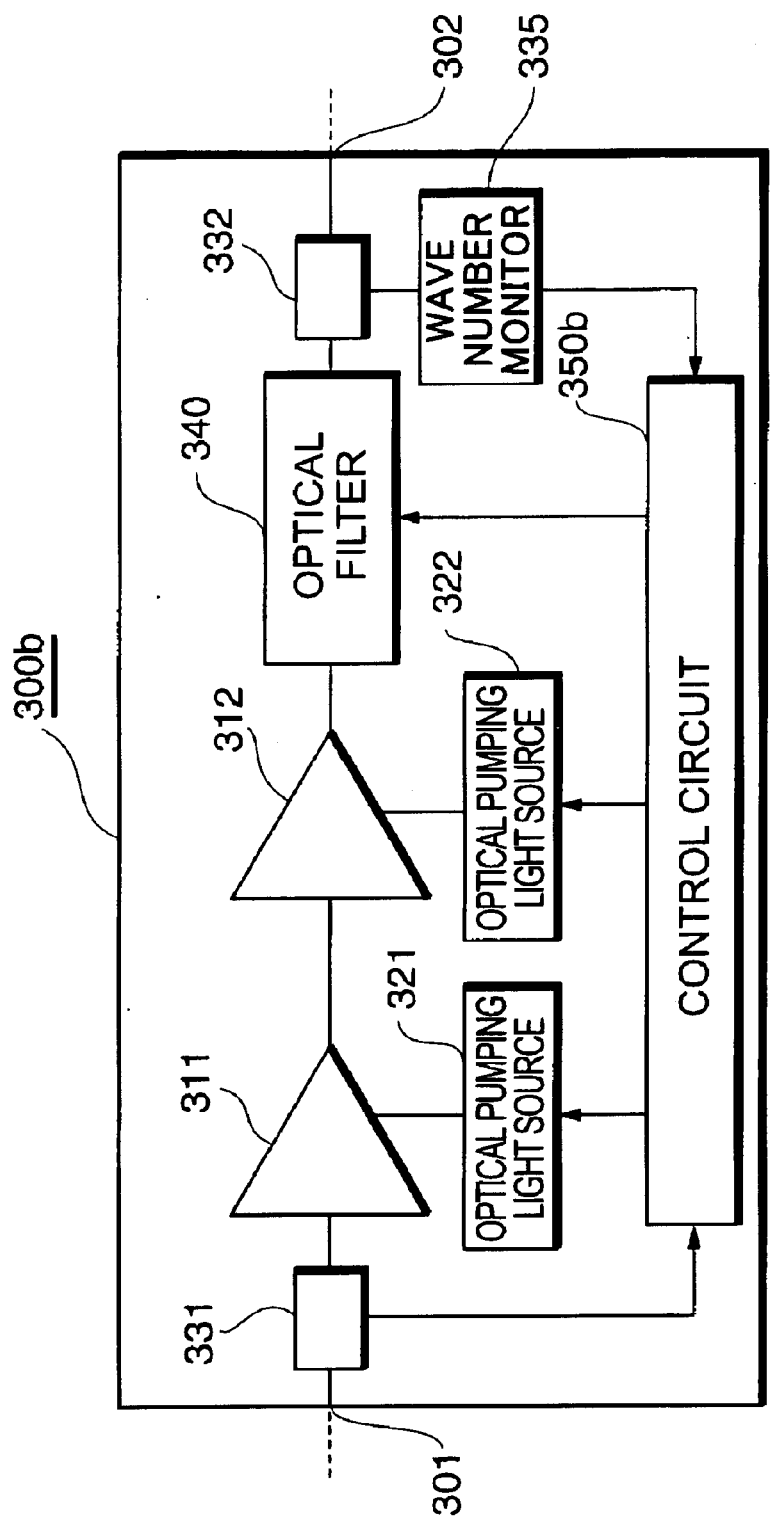
FIG. 18 is a schematic view showing the arrangement of an optical amplifier according to the eighth embodiment of the present invention.

FIG. 18 is a schematic view showing the arrangement of an optical amplifier 300b according to the eighth embodiment of the present invention. The optical amplifier 300b according to this embodiment is different from the optical amplifier 300 of the third embodiment shown in FIG. 9 in that a wave number monitor 335 for detecting the number of signal light components (wave number) contained in output multiplexed signal light is arranged at the demultiplexed side of an optical coupler 332 at the final stage.

When the number of waves contained in input multiplexed signal light varies, the power of the input multiplexed signal light varies, though the powers of individual signal light components do not vary. For this reason, when the power of output multiplexed signal light after amplification is to be simply maintained at a predetermined value, the powers of individual signal light components increase in case of a decrease in wave number, or the powers of individual signal light components decrease in case of an increase in wave number, resulting in variation.

In this embodiment, the target value of power of output multiplexed signal light is adjusted by a control circuit 350b in proportion to the wave number on the basis of the output from the wave number monitor 335. Thus, even when the wave number varies, the light power after the individual signal light components are amplified can be maintained at a predetermined value.

The present invention is not limited to the above embodiments, and various changes and modifications can be made. For example, the fluorescent material to doped into the amplification optical fiber is not limited to Er, and another rare earth element (e.g., Tm, Pr, Nd, or the like) may be used. Instead of the amplification optical fiber, a planar optical waveguide doped with a fluorescent material that can be excited by optical pumping light may be used. The optical amplifier need not always be divided into the input-side optical amplification section and output-side optical amplification section and may have three or more optical amplification sections.

What is claimed is:

1. An optical amplifier for amplifying, at once, multiplexed signal light belonging to a predetermined wavelength band, in which a plurality of signal light components having different wavelengths are multiplexed, comprising:

one or a plurality of optical amplification sections each of which has an optical waveguide doped with a fluorescent material and amplifies the multiplexed signal light by optical pumping of the fluorescent material;

optical pumping light sources for supplying predetermined optical pumping light to said optical amplification section(s);

an optical filter capable of changing a gradient $dL/d\lambda$ of a loss L (dB) with respect to a wavelength $\lambda$ (nm) in the predetermined wavelength band in response to a change of the gain wavelength dependence in the optical amplification section(s); and control means for controlling each optical pumping light output from said optical pumping light sources so as to keep the total power of light output from said optical amplifier at predetermined level and controlling the gradient $dL/d\lambda$ of said optical filter so as to flatten the wavelength dependence of light power output from said optical amplifier.

2. An amplifier according to claim 1, wherein said optical filter satisfies $$\approx a(\lambda - \lambda c) + b$$

(where $\lambda c$ (nm) and b (dB) are constants) in the predetermined wavelength band and changes a (dB/nm) to adjust the gradient $dL/d\lambda$; and $\lambda c$ and b are set constant prior to control of $dL/d\lambda$.

3. An amplifier according to claim 1, further comprising a gain equalizer for compensating for an inherent wavelength-dependent gain of said optical amplification section.

4. An amplifier according to claim 1, further comprising a wave number monitor for detecting the number of signal light components contained in the multiplexed signal light, and wherein said control means maintains each light power of signal light component after amplification at a constant by controlling the power of each optical pumping light from said optical pumping light source(s) in accordance with the number of signal light components detected by said wave number monitor.

5. An amplifier according to claim 1, further comprising input light power detection means for detecting the light power input to said optical amplification section, and wherein said control means adjusts the gradient $dL/d\lambda$ of said optical filter on the basis of the detection result by said input light power detection means.

6. An amplifier according to claim 1, further comprising gain detection means for detecting a gain of said optical amplification section, and wherein said control means adjusts the gradient $dL/d\lambda$ of said optical filter on the basis of the detection result by said gain detection means.

7. An amplifier according to claim 1, further comprising detection means for detecting each wavelength and power of signal light components contained in the light output from said optical amplification section, and wherein said control means adjusts the gradient $dL/d\lambda$ of said optical filter on the basis of power deviation between two signal light components having shortest and longest wavelengths detected by said detection means.

8. An amplifier according to claim 7, further comprising read means for reading information related to the shortest and longest wavelengths of the signal light components in the multiplexed signal light sent together with the multiplexed signal light, and wherein said control means obtains the power deviation on the basis of the information obtained by said read means.

9. An amplifier according to claim 1, further comprising ASE light level detection means for detecting an ASE light levels of the light output from said optical amplification section at each wavelengths outside two ends of the predetermined wavelength band, and wherein said control means adjusts the gradient $dL/d\lambda$ of said optical filter so that a level difference between ASE light levels detected by said ASE light level detection means becomes constant.

10. An amplifier according to claim 1, further comprising:

detection means for detecting each wavelength and power of signal light components contained in the light output from said optical amplification section; and ASE light level detection means for detecting an ASE light levels of the light output from said optical amplification section at each wavelengths one of which is shorter than the shortest wavelength and the other of which is longer than the longest wavelength both of which detected by said detection means; and wherein said control means adjusts the gradient $dL/d\lambda$ of said optical filter so that a level difference between ASE light levels detected by said ASE light level detection means becomes constant.

11. An amplifier according to claim 10, further comprising read means for reading information related to the shortest and longest wavelengths of the signal light components in the multiplexed signal light sent together with the multiplexed signal light, and wherein said ASE light level detection means determines wavelengths to be detected on the basis of the information obtained by said read means.

12. An amplifier according to claim 2, wherein $\lambda c$ of said optical filter is set in the predetermined wavelength band prior to control by said control means.

13. An amplifier according to claim 1, wherein said optical filter comprises:

a main optical path which guides the multiplexed signal light and is divided into first to sixth regions sequentially from an upstream side;

a first sub optical path which is arranged close to the first and third regions of the main optical path so that optical coupling of propagation light occurs, is spaced apart from the second region of the main optical path so that optical coupling of the propagation light does not occur, and has a region corresponding to the second region of the main optical path, the region having a length different from that of the main optical path;

a second sub optical path which is arranged close to the fourth and sixth regions of the main optical path so that optical coupling of the propagation light occurs, is spaced apart from the fifth region of the main optical path so that optical coupling of the propagation light does not occur, and has a region corresponding to the fifth region of the main optical path, the region having a length different from that of the main optical path;

a first temperature adjusting device arranged in at least one of the second region of the main optical path and the region of the first sub optical path, which corresponds to the second region of the main optical path; and a second temperature adjusting device arranged in at least one of the fifth region of the main optical path and the region of the second sub optical path, which corresponds to the fifth region of the main optical path.

14. An optical amplification method of amplifying, at once, multiplexed signal light belonging to a predetermined wavelength band, in which a plurality of signal light channels having different wavelengths are multiplexed, comprising the steps of:

guiding the multiplexed signal light to an optical waveguide doped with a fluorescent material together with predetermined optical pumping light and optically amplifying the multiplexed signal light;

guiding the multiplexed signal light channels to an optical filter capable of changing a gradient $dL/d\lambda$ of a loss $L$ (dB) with respect to a wavelength $\lambda$ (nm) in the predetermined wavelength band and controlling the gradient $dL/d\lambda$ of the optical filter so as to flatten the wavelength dependence of light power obtained by said optical amplifying method; and controlling an intensity of the optical pumping light to keep the total power of multiplexed signal light obtained by said optical amplifying method at predetermined level.

15. A method according to claim 14, wherein the optical filter satisfies $$L \approx a(\lambda - \lambda c) + b$$

(where $\lambda c$ (nm) and $b$ (dB) are constants) in the predetermined wavelength band and changes $a$(dB/mn) to adjust the gradient $dL/d\lambda$; and $\lambda c$ and $b$ are set constant prior to control of $dL/d\lambda$.

16. A method according to claim 14, further comprising the step of reducing an inherent wavelength-dependent gain in the optical amplification using a predetermined gain equalizer.

17. A method according to claim 14, further comprising the step of detecting the number of signal light components contained in the multiplexed signal light and adjusting the target value of light power after amplification in accordance with the detected number of signal light components.

18. a method according to claim 14, further comprising the step of adjusting the gradient $dL/d\lambda$ of the optical filter on the basis of light power of the multiplexed signal light before the optical amplification.

19. A method according to claim 14, further comprising the step of adjusting the gradient $dL/d\lambda$ of the optical filter on the basis of the gain in the optical amplification.

20. A method according to claim 14, further comprising the step of adjusting the gradient $dL/d\lambda$ of the optical filter on the basis of deviation of light power between two different wavelengths detected in the predetermined wavelength band of the light after the optical amplification.

21. A method according to claim 20, further comprising the step of reading information related to shortest and longest wavelengths of the signal light components in the multiplexed signal light components in the multiplexed signal light sent together with the multiplexed signal light, and wherein the two different wavelengths are the read shortest and longest wavelengths.

22. A method according to claim 14, further comprising detecting ASE light levels of each of wavelengths outside two ends of the predetermined wavelength band of the light after optical amplification and adjusting the gradient $dL/d\lambda$ of the optical filter so that a difference between two ASE light levels becomes constant.

23. A method according to claim 14, further comprising the step of detecting each wavelength and power of signal light components contained in the light after the optical amplification and detecting ASE light levels at each wavelengths one of which is shorter than the shortest detected wavelength and the other of which is longer than the longest detected wavelength.

24. A method according to claim 23, further comprising the step of reading information related to shortest and longest wavelengths of the signal light components in the multiplexed signal light sent together with the multiplexed signal light, and determining two wavelengths to be ASE light levels detected, on the basis of the read shortest wavelength and longest wavelength.

25. A method according to claim 15, wherein $\lambda c$ of the optical filter is set and adjusted in the predetermined wavelength band prior to said controlling step.

26. A method according to claim 14, further comprising when a total transmittance in the predetermined wavelength band of the optical filter is adjusted to a maximum value, adjusting the loss $L$ to be substantially constant independently of the wavelength.

27. A method according to claim 14, wherein the optical filter comprises:

a main optical path which guides the multiplexed signal light and is divided into first to sixth regions sequentially from an upstream side;

a first sub optical path which is arranged close to the first and third regions of the main optical path so that optical coupling of propagation light occurs, is spaced apart from the second region of the main optical path so that optical coupling of the propagation light does not occur, and has a region corresponding to the second region of the main optical path, the region having a length different from that of the main optical path;

a second sub optical path which is arranged close to the fourth and sixth regions of the main optical path so that optical coupling of the propagation light occurs, is spaced apart from the fifth region of the main optical path so that optical coupling of the propagation light does not occur, and has a region corresponding to the fifth region of the main optical path, the region having a length different from that of the main optical path; and said adjusting the gradient dL/dλ of the optical filter is achieved by adjusting at least one of a temperature in the first sub optical path and a temperature in a region of the main optical path which corresponds to the first sub optical path, and at least one of a temperature in the second sub optical path and a temperature in a region of the main optical path which corresponds to the second sub optical path.

28. An amplifier according to claim 1, wherein said predetermined wavelength band has band-width not less than 20 nm.

29. An optical amplifier for amplifying, at once, multiplexed signal light belonging to a predetermined wavelength band, in which a plurality of signal light components having different wavelengths are multiplexed, comprising:

one or a plurality of optical amplification sections each of which has an optical waveguide doped with a fluorescent material and amplifies the multiplexed signal light by optical pumping of the fluorescent material;

an optical pumping light source for supplying predetermined optical pumping light to said optical amplification section;

an optical filter capable of changing a gradient dL/dλ of a loss L (dB) with respect to a wavelength λ (nm) in the predetermined wavelength band in response to change of the gain wavelength dependence in the optical amplification section(s);

a gain equalizer for compensating for an inherent wavelength-dependent gain of said optical amplification section; and control means for controlling each optical pumping light output from said optical pumping light source(s) so as to keep the total power of light output from said optical amplifier at predetermined level and controlling the gradient dL/dλ of said optical filter so as to flatten the wavelength dependence of light power output from said optical amplifier.

30. A method according to claim 14, wherein said predetermined wavelength band has band-width not less than 20 nm.

31. An optical amplification method of amplifying, at once, multiplexed signal light belonging to a predetermined wavelength band, in which a plurality of signal light components having different wavelengths are multiplexed, comprising the steps of:

guiding the multiplexed signal light to an optical waveguide doped with a fluorescent material together with predetermined optical pumping light and optically amplifying the multiplexed signal light;

guiding the multiplexed signal light components to an optical filter capable of changing a gradient dL/dλ of a loss L (dB) with respect to a wavelength x (nm) in the predetermined wavelength band and controlling the gradient dL/dλ of the optical filter so as to flatten the wavelength dependence of light power obtained by said optical amplifying method;

reducing an inherent wavelength-dependent gain in the optical amplification using a predetermined gain equalizer; and controlling an intensity of the optical pumping light to keep the total power of multiplexed signal light obtained by said optical amplifying method at predetermined level.

* * * * *